(12) United States Patent
Park et al.

(10) Patent No.: US 11,017,399 B2
(45) Date of Patent: May 25, 2021

(54) METHOD AND ELECTRONIC DEVICE FOR PAYMNET USING BIOMETRIC AUTHENTICATION

(71) Applicant: Samsung Electronics Co., Ltd., Gyeonggi-do (KR)

(72) Inventors: Yong Seok Park, Gyeonggi-do (KR); Seong Il Kim, Gyeonggi-do (KR); In Ho Kim, Gyeonggi-do (KR); Tae Yun Kim, Gyeonggi-do (KR); Seung Won Oh, Gyeonggi-do (KR); Ji Su Oh, Gyeonggi-do (KR); Yong Wan Lee, Seoul (KR); You Na Lee, Seoul (KR); Dong Ho Jang, Gyeonggi-do (KR); Jae Man Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 419 days.

(21) Appl. No.: 15/663,355

(22) Filed: Jul. 28, 2017

(65) Prior Publication Data

US 2018/0033013 A1    Feb. 1, 2018

(30) Foreign Application Priority Data

Jul. 28, 2016 (KR) .................. 10-2016-0096453

(51) Int. Cl.
*G06Q 20/14* (2012.01)
*G06Q 20/10* (2012.01)
(Continued)

(52) U.S. Cl.
CPC ....... *G06Q 20/40145* (2013.01); *G06Q 20/20* (2013.01); *G06Q 20/325* (2013.01);
(Continued)

(58) Field of Classification Search
CPC ............................................. G06Q 20/00–425
See application file for complete search history.

(56) References Cited

U.S. PATENT DOCUMENTS 7,856,166 B2   12/2010   Biribuze et al.
7,921,297 B2    4/2011   Ortiz et al.
(Continued)

FOREIGN PATENT DOCUMENTS

JP    2005317049    11/2005
JP    2006079537     3/2006
(Continued)

OTHER PUBLICATIONS

European Search Report dated Feb. 22, 2019 issued in counterpart application No. 17183066.4-1217, 7 pages.

(Continued)

*Primary Examiner* — Calvin L Hewitt, II
*Assistant Examiner* — Chenyuh Kuo
(74) *Attorney, Agent, or Firm* — The Farrell Law Firm, P.C.

(57) ABSTRACT

An electronic device and a method of payment by the electronic device are provided. The electronic device includes a local wireless communication circuit, a first biometric sensor and a second biometric sensor, a security module configured to store payment information corresponding to a payment card, a processor electrically connected to the first biometric sensor, the second biometric sensor, the local wireless communication circuit, and the security module, and a memory electrically connected to the processor, wherein the memory is configured to store instructions that cause the processor to select at least one of the first biometric sensor or the second biometric sensor, based on a security policy of an issuer of the payment card or a security policy of the payment card, authenticate a user by using the selected biometric sensor, and if the authentication is successful, transmit the payment information to an external device through the local wireless communication circuit.

6 Claims, 10 Drawing Sheets

(51) Int. Cl.
    *G06Q 20/40*         (2012.01)
    *G06Q 20/38*         (2012.01)
    *G06F 16/182*        (2019.01)
    *G06Q 20/32*         (2012.01)
    *G06Q 20/20*         (2012.01)

(52) U.S. Cl.
    CPC ....... *G06Q 20/327* (2013.01); *G06Q 20/3278* (2013.01); *G06Q 20/405* (2013.01); *G06Q 20/4097* (2013.01)

(56) References Cited

U.S. PATENT DOCUMENTS

| | | | |
|---|---|---|---|
| 8,331,752 | B2 | 12/2012 | Biribuze et al. |
| 8,499,164 | B2 | 7/2013 | Ortiz et al. |
| 8,706,634 | B2 | 4/2014 | Evans et al. |
| 9,305,298 | B2 | 4/2016 | Wilson |
| 9,323,912 | B2 | 4/2016 | Schultz et al. |
| 9,357,676 | B2 | 5/2016 | Yamaguchi et al. |
| 9,396,320 | B2 | 7/2016 | Lindemann |
| 9,503,894 | B2 * | 11/2016 | Shanmugam ....... H04L 63/0853 |
| 2003/0163710 | A1 | 8/2003 | Ortiz et al. |
| 2004/0257196 | A1 | 12/2004 | Kotzin |
| 2010/0017881 | A1 * | 1/2010 | Goyet .................... G06F 21/55 726/24 |
| 2010/0054681 | A1 | 3/2010 | Biribuze et al. |
| 2010/0161488 | A1 * | 6/2010 | Evans .................... G06Q 20/20 705/44 |
| 2010/0194571 | A1 | 8/2010 | Ortiz et al. |
| 2011/0085776 | A1 | 4/2011 | Biribuze et al. |
| 2011/0191840 | A1 | 8/2011 | Ortiz et al. |
| 2013/0227651 | A1 | 8/2013 | Schultz et al. |
| 2013/0332365 | A1 | 12/2013 | Evans et al. |
| 2014/0157401 | A1 | 6/2014 | Alameh et al. |
| 2014/0289116 | A1 | 9/2014 | Pollvanyi |
| 2014/0289117 | A1 | 9/2014 | Baghdasaryan |
| 2014/0289509 | A1 | 9/2014 | Baghdasaryan |
| 2014/0289528 | A1 | 9/2014 | Baghdasaryan |
| 2014/0289790 | A1 | 9/2014 | Wilson |
| 2014/0289808 | A1 | 9/2014 | Blanke |
| 2014/0289819 | A1 | 9/2014 | Lindemann |
| 2014/0289820 | A1 | 9/2014 | Lindemann et al. |
| 2014/0289821 | A1 | 9/2014 | Wilson |
| 2014/0289822 | A1 | 9/2014 | Wilson |
| 2014/0289834 | A1 | 9/2014 | Lindemann |
| 2015/0294313 | A1 | 10/2015 | Kamal et al. |
| 2016/0147987 | A1 * | 5/2016 | Jang ..................... G06F 21/32 726/19 |
| 2016/0359827 | A1 * | 12/2016 | Krishnaiah ........... G06F 21/31 |
| 2017/0061441 | A1 * | 3/2017 | Kamal ............ G06Q 20/40145 |
| 2018/0005395 | A1 * | 1/2018 | D'Angelo ............... G06T 7/337 |

FOREIGN PATENT DOCUMENTS

| | | |
|---|---|---|
| JP | 2008113704 | 5/2008 |
| KR | 10-2005-0090747 | 9/2005 |
| WO | WO 2004/100084 | 11/2004 |
| WO | WO 2015/130967 | 9/2015 |
| WO | WO 2016/102408 | 6/2016 |

OTHER PUBLICATIONS

European Search Report dated Nov. 10, 2017 issued in counterpart application No. 17183066.4-1871, 7 pages.
EP Summons to Attend Oral Proceedings dated Nov. 24, 2020 issued in counterpart application No. 17183066.4-1213, 8 pages.

* cited by examiner

METHOD AND ELECTRONIC DEVICE FOR PAYMNET USING BIOMETRIC AUTHENTICATION

PRIORITY

This application claims priority under 35 U.S.C. § 119(a) to a Korean Patent Application filed on Jul. 28, 2016 in the Korean Intellectual Property Office and assigned Serial number 10-2016-0096453, the entire disclosure of which is incorporated herein by reference.

BACKGROUND

1. Field of the Disclosure

The present disclosure relates generally to a payment method using biometric authentication and an electronic device performing the same, and more particularly, to a payment method using biometric authentication and an electronic device performing the same by selecting a biometric sensor that is the most appropriate to perform user authentication for a mobile payment transaction.

2. Description of the Related Art

Due to the development of information technology (IT), an electronic device has significantly superior functions and provides a user with various functions. An electronic device provides a user with a multimedia service, for example, a music service, a video service, a digital broadcast service, and a network-based communication service such as a call service, a wireless Internet service, a short message service (SMS), a multimedia messaging service (MMS), and the like.

Currently, financial technology (Fin-tech) which is a combination of finance technology and IT technology is getting attention. Fin-tech evaluated as a financial paradigm shift extends its boundary to off-line financial service, a building service of a finance platform, and a conventional on-line financial service.

For example, manufacturers of electronic devices expend effort to build a payment system platform, spread a mobile payment service, and the like through the cooperation of a credit card company or a bank.

An electronic device may be used as a payment means in a mobile payment service. Since a mobile payment service involves an exchange of money for goods/service, whether a user of a mobile payment service is a bona fide user is a significant issue. To this end, a way of using various types of biometric sensors having a high security level has been proposed for user authentication. However, since security policies (or authentication policies) of a credit card company and a financial institution are different from each other, it is impossible to compel the use of only one biometric sensor.

SUMMARY

An aspect of the present disclosure is to provide a payment method using biometric authentication and an electronic device performing the same.

According to an embodiment of the present disclosure, in a case where a plurality of biometric sensors are provided in an electronic device, it may be possible to provide a method of selecting a biometric sensor that is the most appropriate to perform user authentication for a mobile payment transaction.

In accordance with an aspect of the present disclosure, an electronic device is provided. The electronic device includes a local wireless communication circuit, a first biometric sensor and a second biometric sensor, a security module configured to store payment information corresponding to a payment card, a processor electrically connected to the first biometric sensor, the second biometric sensor, the local wireless communication circuit, and the security module, and a memory electrically connected to the processor, wherein the memory is configured to store instructions that cause the processor to select at least one of the first biometric sensor or the second biometric sensor, based on a security policy of an issuer of the payment card or a security policy of the payment card, authenticate a user by using the selected biometric sensor, and if the authentication is successful, transmit the payment information to an external device through the local wireless communication circuit.

In accordance with another aspect of the present disclosure, a method of payment by an electronic device is provided. The method includes selecting at least one of a first biometric sensor or a second biometric sensor, based on a security policy of an issuer of a payment card or a security policy of the payment card; authenticating a user by using the selected biometric sensor; and transmitting payment information corresponding to the payment card to an external device if the authentication is successful.

In accordance with another aspect of the present disclosure, an electronic device is provided. The electronic device includes a housing, a display exposed through the housing, a fingerprint sensor exposed through the housing, an image sensor configured to capture an image of an outside through the housing, at least one local wireless communication circuit included in the housing, at least one cellular communication circuit included in the housing, a processor electrically connected to the display, the fingerprint sensor, the image sensor, the local wireless communication circuit, and the cellular communication circuit, and a memory electrically connected to the processor and configured to store information associated with a first payment card and a second payment card, wherein the memory is configured to store instructions, when executed, that cause the processor to provide a user interface that allows a user to select the first payment card or the second payment card, on the display, receive a user input for selecting the first payment card or the second payment card, verify a biometric authentication scheme for using the selected first payment card or the selected second payment card, obtain biometric information of the user using at least one of the fingerprint sensor or the image sensor, depending on the verified biometric authentication scheme, compare the biometric information to reference biometric information stored in advance in the memory, and transmit payment information associated with the selected first payment card or the selected second payment card using the local wireless communication circuit, depending on the result of comparing the biometric information to the reference biometric information.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT

Disclosure

Figure 1:
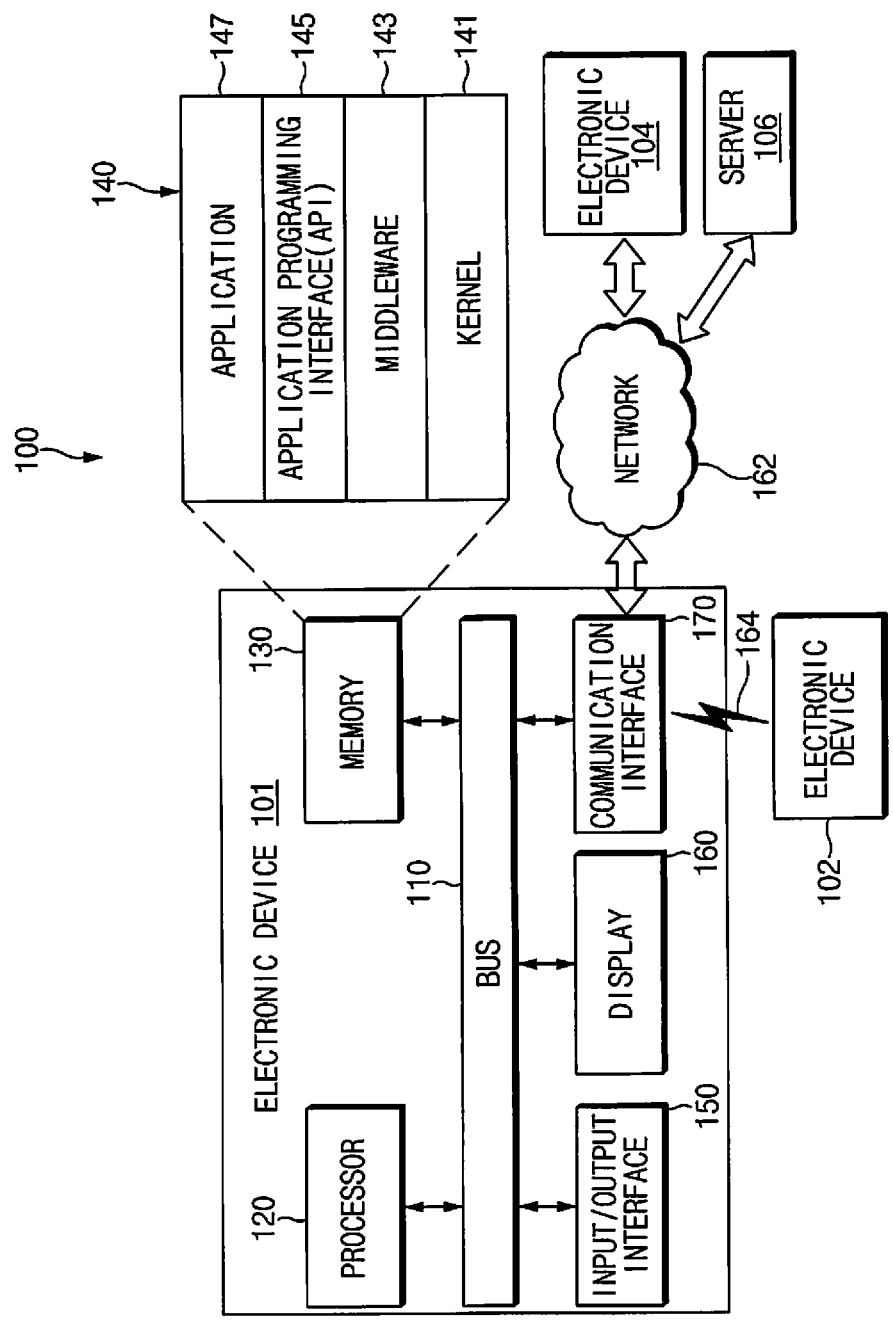
FIG. 1 is a block diagram of an electronic device of a network environment according to an embodiment of the present disclosure.

Hereinafter, various embodiments of the present disclosure are described with reference to accompanying drawings. Accordingly, those skilled in the art will recognize that a modification, an equivalent, and/or an alternative of the various embodiments described herein may be made without departing from the scope and spirit of the present disclosure. With regard to the descriptions of the accompanying drawings, similar elements may be marked by similar reference numerals.

In the present disclosure, the expressions "have", "may have", "include" and "comprise", "may include" and "may comprise" indicate the existence of corresponding features (e.g., elements such as numeric values, functions, operations, or components) but do not exclude the presence of additional features.

In the present disclosure, the expressions "A or B", "at least one of A and/or B", "one or more of A and/or B", and the like may include any and all combinations of one or more of the associated listed items. For example, the expressions "A or B", "at least one of A and B", and "at least one of A or B" may refer to all of (1) where at least one A is included, (2) where at least one B is included, and (3) where both of at least one A and at least one B are included.

The expressions "first", "second", and the like used in the present disclosure may be used to refer to various elements regardless of order and/or priority and to distinguish the relevant elements from other elements, but are not intended to limit the elements. For example, "a first user device" and "a second user device" indicate different user devices regardless of order or priority. For example, without departing from the scope and spirit of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), the element may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used in the present disclosure may be used instead of, for example, the expressions "suitable for", "having the capacity to", "designed to", "adapted to", "made to", or "capable of". The term "configured to" does not indicate only "specifically designed to" in hardware. Instead, the expression "a device configured to" may indicate that the device is "capable of" operating together with another device or other components. For example, a "processor configured to (or set to) perform A, B, and C" may indicate a dedicated processor (e.g., an embedded processor) for performing a corresponding operation or a general-purpose processor (e.g., a central processing unit (CPU) or an application processor (AP)) which performs corresponding operations by executing one or more software programs which are stored in a memory device.

Terms used in the present disclosure are used to describe certain embodiments but are not intended to limit the scope of the present disclosure. Terms of a singular form may include plural forms unless otherwise specified. All of the terms used herein, may have the same meanings that are generally understood by those skilled in the art. It will be further understood that terms, which are defined in a dictionary and commonly used, should also be interpreted as being customary in the relevant art and not in an idealized or overly formal manner unless expressly so defined in an embodiment of the present disclosure. In some cases, even if certain terms are defined in the present disclosure, they are not intended to be interpreted to exclude an embodiment of the present disclosure.

An electronic device according to an embodiment of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, and wearable devices. A wearable device may include at least one type of an accessory (e.g., watches, rings, bracelets, anklets, necklaces, glasses, contact lens, and head-mounted-devices (HMDs), a type of fabric or integrated garment (e.g., electronic apparel), a type of body attachment (e.g., a skin pad or tattoos), or a type bio-implantation (e.g., an implantable circuit).

According to an embodiment of the present disclosure, an electronic device may be a home appliance. Home appliances may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync®, Apple TV®, and Google TV™), game consoles (e.g., Xbox® and PlayStation®), electronic dictionaries, electronic keys, camcorders, electronic picture frames, and the like.

According to an embodiment of the present disclosure, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA) device, a magnetic resonance imaging (MRI) device, a computed tomography (CT) device, scanners, and ultrasonic devices), navigation devices, a global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), point of sales (POS) devices of stores, and Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, an electronic device may include at least one of parts of furniture or buildings/structures, electronic boards, electronic signature receiving devices, projectors, and various measuring instruments (e.g., water meters, electricity meters, gas meters, wave meters, and the like). An electronic device may be one of the above-described devices or a combination thereof. An electronic device may be a flexible electronic device. Furthermore, an electronic device is not intended to be limited to the above-described electronic devices but may include other electronic devices and new electronic devices to be developed.

Hereinafter, electronic devices according to various embodiments of the present disclosure are described with reference to the accompanying drawings. In the present disclosure, the term "user" may refer to a person who uses an electronic device or may refer to a device (e.g., an artificial intelligence electronic device) that uses an electronic device.

FIG. 1 is a block diagram of electronic device of a network environment 100, according to an embodiment of the present disclosure.

Referring to FIG. 1, the electronic device 101 may be connected to an external device (e.g., electronic device 102, electronic device 104 or a server 106) over a network 162 or via local wireless communication 164. The electronic device 101 may include a bus 110, a processor 120, a memory 130, an input/output interface 150, a display 160, and a communication interface 170. According to an embodiment of the present disclosure, the electronic device 101 may omit at least one of the above-described elements 110 to 170 or may further include other element(s).

For example, the bus 110 may interconnect the above-described elements 110 to 170 and may include a circuit for conveying communications (e.g., a control message and/or data) among the above-described elements 110 to 170.

The processor 120 may include one or more of a CPU, an AP, or a communication processor (CP). For example, the processor 120 may perform an arithmetic operation or data processing associated with control and/or communication of at least one other element(s) 110 to 170 of the electronic device 101.

The memory 130 may include a volatile and/or a nonvolatile memory. For example, the memory 130 may store instructions or data associated with at least one other element(s) of the electronic device 101. According to an embodiment of the present disclosure, the memory 130 may store software and/or a program 140. The program 140 may include, for example, a kernel 141, middleware 143, an application programming interface (API) 145, and/or an application program (or an application) 147. At least a part of the kernel 141, the middleware 143, and the API 145 may be referred to as an operating system (OS).

For example, the kernel 141 may control or manage system resources (e.g., the bus 110, the processor 120, the memory 130, and the like) that are used to execute operations or functions of other programs (e.g., the middleware 143, the API 145, and the application 147). Furthermore, the kernel 141 may provide an interface that allows the middleware 143, the API 145, or the application 147 to access discrete elements of the electronic device 101 so as to control or manage system resources.

The middleware 143 may perform, for example, a mediation role such that the API 145 or the application 147 may communicate with the kernel 141 to exchange data.

Furthermore, the middleware 143 may process one or more task requests received from the application 147 according to a priority. For example, the middleware 143 may assign a priority, which makes it possible to use a system resource (e.g., the bus 110, the processor 120, the memory 130, or the like) of the electronic device 101, to at least one of the applications 147. For example, the middleware 143 may process one or more task requests according to a priority assigned to the at least one of the applications 147, which makes it possible to perform scheduling or load balancing on the one or more task requests.

The API 145 may be, for example, an interface through which the application 147 controls a function provided by the kernel 141 or the middleware 143, and may include, for example, at least one interface or function (e.g., instructions) for a file control, a window control, image processing, a character control, and the like.

The input/output interface 150 may play a role, for example, of an interface which transmits instructions or data input from a user or another external device, to other element(s) of the electronic device 101. Furthermore, the input/output interface 150 may output instructions or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and the first external electronic device 102, the second external electronic device 104, or the server 106. For example, the communication interface 170 may be connected to the network 162 over wireless communication or wired communication to communicate with the second external electronic device 104 or the server 106.

Wireless communication may include cellular communication employing at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, as cellular communication protocol. According to an embodiment of the present disclosure, wireless communication may include, for example, at least one of wireless fidelity (Wi-Fi), Bluetooth, Bluetooth low energy (BLE), Zigbee, near field communication (NFC), magnetic secure transmission or magnetic stripe transmission (MST), radio frequency (RF), a body area network (BAN), and a global navigation satellite system (GNSS).

MST may generate a pulse in response to transmission data using an electromagnetic signal, and the pulse may generate a magnetic field signal. The electronic device 101 may transfer the magnetic field signal to a POS device. The POS device may detect a magnetic field signal using a magnetic stripe reader or a magnetic secure reader (MSR). The POS device may recover data by converting a detected magnetic field signal to an electrical signal. In the present disclosure, "MST" may be used to indicate a magnetic secure transmission or a magnetic stripe transmission.

GNSS may include at least one of, for example, a global positioning system (GPS), a global navigation satellite system (Glonass), a Beidou navigation satellite system (Beidou), or a European global satellite-based navigation system (Galileo) based on an available region, a bandwidth, or the like. Hereinafter, in the present disclosure, "GPS" and "GNSS" may be used interchangeably. Wired communication may include at least one of, for example, a universal serial bus (USB), a high definition multimedia interface (HDMI), a recommended standard-232 (RS-232), a plain old telephone service (POTS), and the like. The network 162 may include at least one of telecommunications networks, for example, a computer network (e.g., a local area network (LAN) or a wide area network (WAN)), an Internet, or a telephone network.

Each of the first and second external electronic devices 102 and 104 may be a device for which the type is different from or the same as that of the electronic device 101. According to an embodiment of the present disclosure, the server 106 may include a group of one or more servers.

According to an embodiment of the present disclosure, the server 106 may include a mobile payment service server for implementation of a mobile payment service in the electronic device 101 and/or a payment server of a credit card company (and/or a financial institution). For example, a mobile payment service server may include a server (e.g., a token service provider (TSP) server) that manages a token associated with a payment application. In addition, for example, a payment server of a credit card company (and/or a financial institution) may include a server (e.g., a trusted service manager (TSM) server) that manages a financial account of a user.

According to an embodiment of the present disclosure, a mobile payment service server may provide payment information (e.g., a one-time token (OTT)) to the electronic device 101 every payment transaction through interaction with a payment server of a credit card company (and/or a financial institution). After a certain security authentication, the electronic device 101 may transmit payment information that is provided to the external device 102 or 104 (e.g., a POS terminal) through various channels (e.g., an MST channel, an NFC channel, and the like). The external device 102 or 104 may complete a payment transaction by transmitting payment information to a payment server of a credit card company (and/or a financial institution) and obtaining a payment approval.

According to an embodiment of the present disclosure, security authentication policies to be applied to various payment cards may be determined by a credit card company and/or a financial institution (an example of a credit card issuer). Information (or data) including security authentication policies of various payment cards may be transferred to the electronic device 101 by a mobile payment service server and/or a server of a credit card company (and/or a financial institution).

According to an embodiment of the present disclosure, all or a portion of the operations performed in the electronic device 101 may be executed by another or plural electronic devices (e.g., the electronic devices 102 and 104 or the server 106). In a case where the electronic device 101 executes a function or service automatically or in response to a request, the electronic device 101 might not perform the function or the service internally, but, alternatively, may request that at least a portion of a function associated with the electronic device 101 be performed at another device (e.g., the electronic device 102 or 104 or the server 106). The other electronic device (e.g., the electronic device 102 or 104 or the server 106) may execute the requested function or an additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
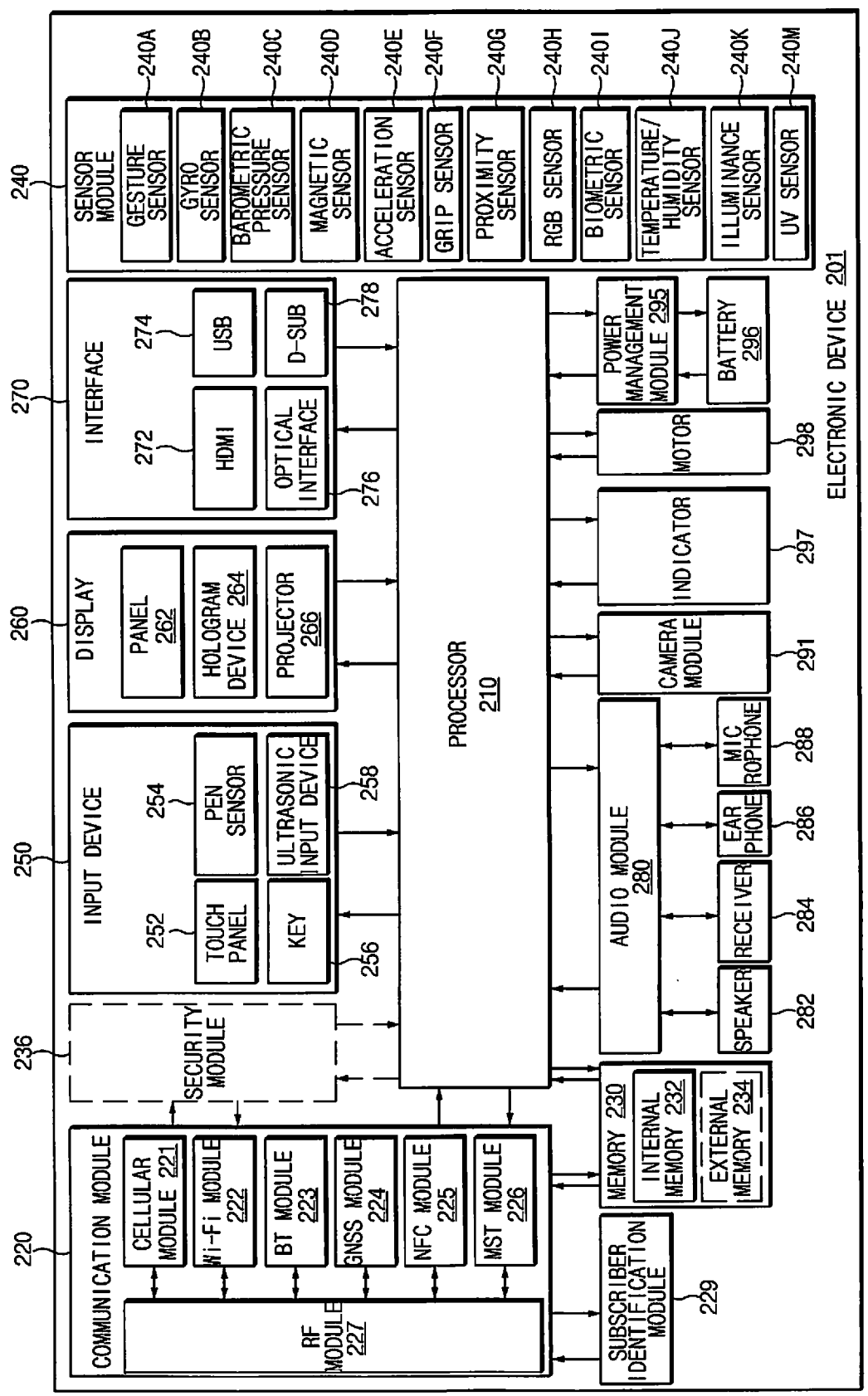
FIG. 2 is a block diagram of an electronic device according to an embodiment of the present disclosure.

FIG. 2 is a block diagram of an electronic device 201, according to an embodiment of the present disclosure.

Referring to FIG. 2, the electronic device 201 may include, for example, an entire part or a part of the electronic device 101 illustrated in FIG. 1. The electronic device 201 may include one or more processors (e.g., an AP) 210, a communication module 220, a subscriber identification module (SIM) 229, a memory 230, a security module 236, a sensor module 240, an input device 250, a display 260, an interface 270, an audio module 280, a camera module 291, a power management module 295, a battery 296, an indicator 297, and a motor 298.

The processor 210 may operate, for example, an OS or an application to control a plurality of hardware or software elements connected to the processor 210 and may process and compute a variety of data. For example, the processor 210 may be implemented with a system on chip (SoC). According to an embodiment of the present disclosure, the processor 210 may further include a graphics processing unit (GPU) and/or an image signal processor. The processor 210 may include at least a part (e.g., a cellular module 221) of elements illustrated in FIG. 2. The processor 210 may load instructions or data, which are received from at least one of the other elements (e.g., a nonvolatile memory), into a volatile memory and process the loaded instructions or data. The processor 210 may store a variety of data in a nonvolatile memory.

The communication module 220 may be configured the same as or similarly to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), an NFC module 225, a MST module 226, and an RF module 227.

The cellular module 221 may provide, for example, voice communication, video communication, a character service, an Internet service, and the like over a communication network. According to an embodiment of the present disclosure, the cellular module 221 may perform discrimination and authentication of the electronic device 201 within a communication network by using the subscriber identification module (e.g., a SIM card) 229. The cellular module 221 may perform at least a portion of the functions that the processor 210 provides. The cellular module 221 may include a communication processor (CP).

Each of the Wi-Fi module 222, the BT module 223, the GNSS module 224, the NFC module 225, and the MST module 226 may include a processor for processing data exchanged through a corresponding module, for example. According to an embodiment of the present disclosure, at least a part (e.g., two or more) of the cellular module 221, the Wi-Fi module 222, the BT module 223, the GNSS module 224, the NFC module 225, and the MST module 226 may be included within one integrated circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, and the like. According to an embodiment of the present disclosure, at least one of the cellular module 221, the Wi-Fi module 222, the BT module 223, the GNSS module 224, the NFC module 225, or the MST module 226 may transmit and receive an RF signal through a separate RF module.

The SIM 229 may include, for example, a card and/or embedded SIM and may include unique identification information (e.g., an integrated circuit card identifier (ICCID)) or subscriber information (e.g., an international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), and the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), and the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is greater than that of the memory 230 and may be a circuit that guarantees safe data storage and a protected execution environment. The security module 236 may be implemented in a separate circuit and may include a separate processor. For example, the security module 236 may be in a smart IC or chip or in a secure digital (SD) card, which is removable, or may include an embedded secure element (eSE) embedded in a fixed chip of the electronic device 201. Furthermore, the security module 236 may operate based on an OS that is different from an OS of the electronic device 201. For example, the security module 236 may operate based on a java card open platform (JCOP) OS.

The sensor module 240 may measure, for example, a physical quantity or may detect an operational state of the electronic device 201. The sensor module 240 may convert measured or detected information into an electrical signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., a red, green, blue (RGB) sensor), a biometric sensor 240I, a temperature/humidity sensor 240J, an illuminance sensor 240K, or an ultraviolet (UV) light sensor 240M. Additionally or generally, the sensor module 240 may further include, for example, an electronic nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment of the present disclosure, the electronic device 201 may further include a processor that is a part of the processor 210 or independent of the processor 210 and is configured to control the sensor module 240. The processor may control the sensor module 240 while the processor 210 remains in a reduced power or sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. In addition, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone 288 and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in space using a light interference phenomenon. The projector 266 may project light onto a screen so as to display an image. For example, the screen may be arranged internal or external of the electronic device 201. According to an embodiment of the present disclosure, the panel 262 may include a pressure sensor (or force sensor) that measures the intensity of touch pressure by a user. The pressure sensor may be integrated with the touch panel 252, or may be implemented as at least one sensor separately from the touch panel 252. The display 260 may further include a control circuit for controlling the panel 262, the hologram device 264, and the projector 266.

The interface 270 may include, for example, an HDMI 272, a USB 274, an optical interface 276, or a D-subminiature (D-sub) connector 278. The interface 270 may be included, for example, in the communication interface 170 illustrated in FIG. 1. Additionally or generally, the interface 270 may include, for example, a mobile high definition link (MHL) interface, an SD card/multi-media card (MMC) interface, or an Infrared Data Association (IrDA) standard interface.

The audio module 280 may convert a sound and an electrical signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may record a still image or a video. According to an embodiment of the present disclosure, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment of the present disclosure, a power management integrated circuit (PMIC), a charger IC, or a battery gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is being charged. The battery 296 may include, for example, a rechargeable battery and/or a solar battery.

The indicator 297 may display a certain state of the electronic device 201 or a part thereof (e.g., the processor 210), such as a booting state, a message state, a charging state, and the like. The motor 298 may convert an electrical signal into a mechanical vibration and may generate the following effects: a vibration, a haptic effect, and the like. A processing device (e.g., a GPU) for supporting mobile TV may be included in the electronic device 201. The processing device for supporting mobile TV may process media data according to the standards of digital multimedia broadcasting (DMB), digital video broadcasting (DVB), Media-FLO™, and the like.

Each of the elements of the electronic device described above according to various embodiments of the present disclosure may be configured with one or more components, and the names of the elements may change according to the type of the electronic device. The electronic device may include at least one of the above-mentioned elements, and some elements may be omitted or other additional elements may be added. Furthermore, some of the elements of the electronic device may be combined with each other to form one entity, so that the functions of the elements may be performed in the same manner as before the combination.

Figure 3:
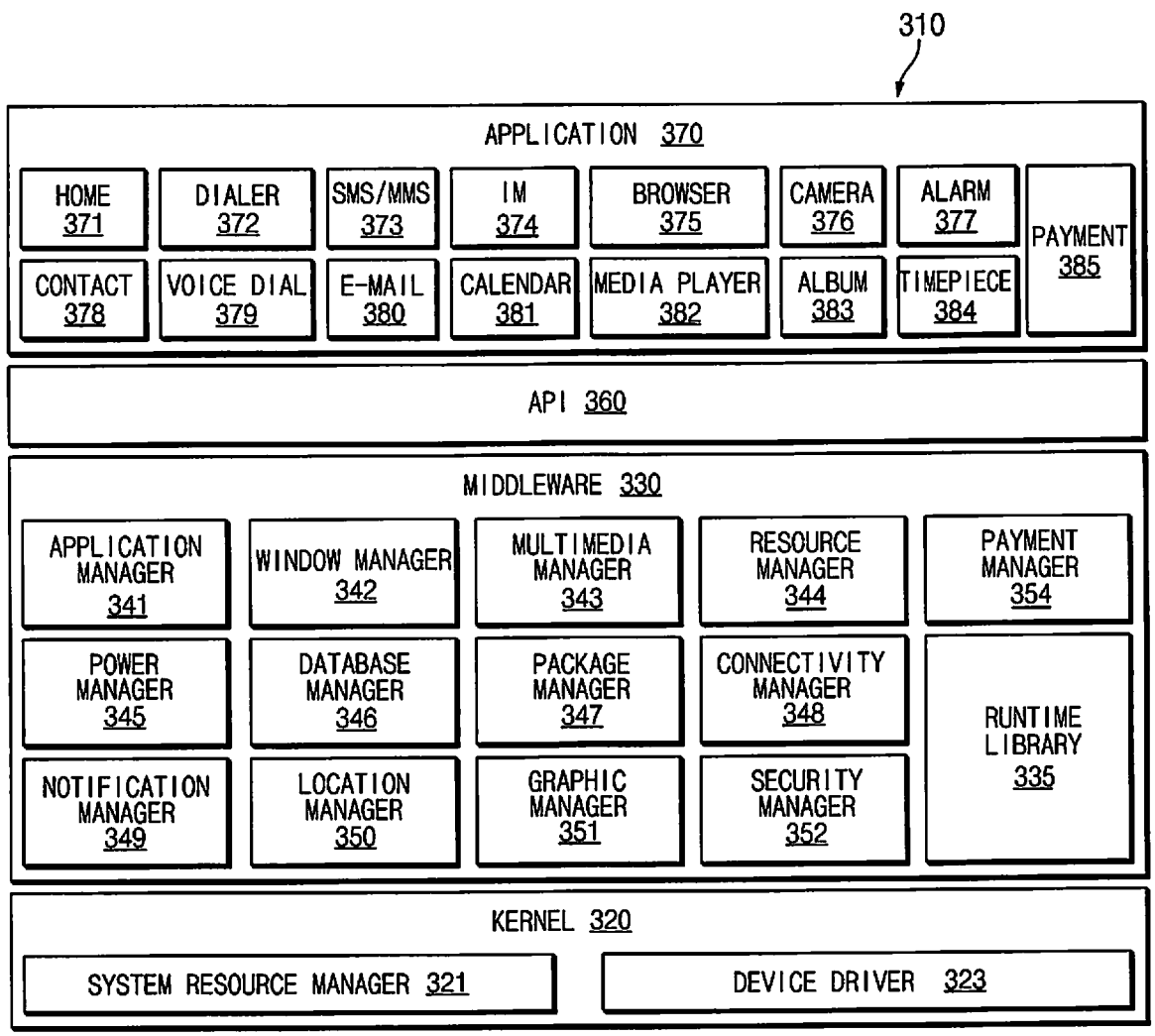
FIG. 3 is a block diagram of a program module according to an embodiment of the present disclosure.

FIG. 3 is a block diagram of a program module, according to an embodiment of the present disclosure.

Referring to FIG. 3, a program module 310 (e.g., the program 140) may include an OS to control resources associated with an electronic device (e.g., the electronic device 101), and/or diverse applications 147 driven on an OS. An OS may be, for example, Android®, iOS®, Windows®, Symbian®, Tizen®, or Bada™.

The program module 310 may include a kernel 320, a middleware 330, an application programming interface (API) 360, and/or an application 370. At least a portion of the program module 310 may be preloaded on an electronic device or may be downloadable from the electronic device 102, the electronic device 104, the server 106, and the like.

The kernel 320 may include, for example, a system resource manager 321 or a device driver 323. The system resource manager 321 may control, allocate, or retrieve system resources. According to an embodiment of the present disclosure, the system resource manager 321 may include a process managing unit, a memory managing unit, a file system managing unit, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs, or may provide diverse functions to the application 370 through the API 360 to allow the application 370 to efficiently use limited system resources of the electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or determine capacities concerning arithmetic functions.

The application manager 341 may manage, for example, a life cycle of at least one application of the application 370. The window manager 342 may manage a GUI resource that is used in a screen. The multimedia manager 343 may identify a format necessary for playing diverse media files, and may perform encoding or decoding of media files by using a codec suitable for the format. The resource manager 344 may manage resources such as storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify a database that is to be used in at least one application of the application 370. The package manager 347 may install or update an application that is distributed in the form of package file.

The connectivity manager 348 may manage, for example, a wireless connection such as Wi-Fi or Bluetooth. The notification manager 349 may display or notify of an event such as an arrival message, an appointment, or a proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment of the present disclosure, in a case where an electronic device 101 includes a telephony function, the middleware 330 may further include a telephony manager for managing a voice or video call function of the electronic device. The payment manager 354 may mediate a payment application 385 and its relevant hardware, e.g., the security module 236, the NFC module 225, the MST module, the biometric sensor 240I and etc., to perform payment transactions.

The middleware 330 may include a middleware module that combines diverse functions of the above-described elements. The middleware 330 may provide a module specialized to each type of OS to provide differentiated functions. Additionally, the middleware 330 may dynamically remove a part of the preexisting elements or may add new elements thereto.

The API 360 may be, for example, a set of programming functions and may be provided with a configuration that is variable depending on an OS. For example, in the case where an OS is Android® or iOS®, the API 360 may provide one API set per platform. In the case where an OS is Tizen®, the API 360 may provide two or more API sets per platform.

The application 370 may include, for example, one or more applications capable of providing functions for a home application 371, a dialer application 372, an SMS/MMS application 373, an instant messaging application (IM) 374, a browser application 375, a camera application 376, an alarm application 377, a contact application 378, a voice dial application 379, an e-mail application 380, a calendar application 381, a media player application 382, an album application 383, a timepiece application 384, a payment application 385, a health care application (e.g., measuring an exercise quantity, blood sugar level, or the like) or an application offering environmental information (e.g., information on barometric pressure, humidity, temperature, or the like).

According to an embodiment of the present disclosure, the application 370 may include an information exchanging application to support information exchange between an electronic device 101 and the electronic device 102 or the electronic device 104. The information exchanging application may include, for example, a notification relay application for transmitting certain information to an external electronic device, or a device management application for managing an external electronic device.

For example, the notification relay application may include a function of transmitting notification information, which arises from other applications (e.g., applications for SMS/MMS 373, e-mail 380, health care, or environmental information), to the electronic device 102 or the electronic device 104. Additionally, the notification relay application may receive, for example, notification information from an external electronic device and provide the notification information to a user.

The device management application may manage (e.g., install, delete, or update), for example, at least one function (e.g., turn-on/turn-off of an external electronic device (or a part of components) or adjustment of brightness (or resolution) of a display) of the external electronic device 102 or 104 which communicates with the electronic device, an application running in the external electronic device 102 or 104, or a service (e.g., a call service, a message service, or the like) provided from the external electronic device 102 or 104.

According to an embodiment of the present disclosure, the application 370 may include an application (e.g., a health care application of a mobile medical device) that is assigned in accordance with an attribute of an external electronic device 102 or 104. The application 370 may include an application that is received from the server 106 or the external electronic device 102 or 104. The application 370 may include a preloaded application or a third party application that is downloadable from a server. The names of elements of the program module 310 may be modifiable depending on the types of OSs.

According to an embodiment of the present disclosure, at least a portion of the program module 310 may be implemented by software, firmware, hardware, or a combination of two or more thereof. At least a portion of the program module 310 may be implemented (e.g., executed), for example, by the processor 210. At least a portion of the program module 310 may include, for example, modules, programs, routines, sets of instructions, processes, or the like for performing one or more functions.

Figure 4:
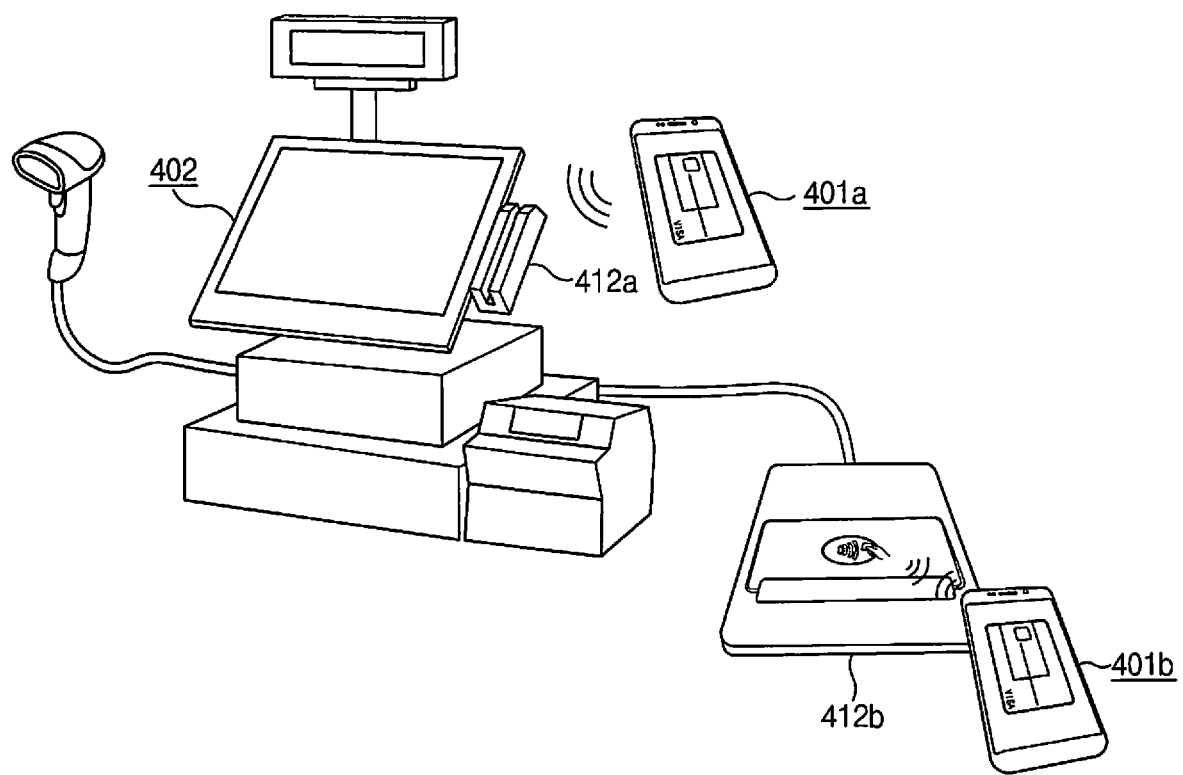
FIG. 4 is a diagram of an environment in which a payment transaction is made, according to an embodiment of the present disclosure.

FIG. 4 is a diagram of an environment in which a payment transaction is made, according to an embodiment of the present disclosure.

Referring to FIG. 4, an electronic device 401a or an electronic device 401b may interact with an external device 402 wirelessly. For example, each of the electronic devices 401a and 401b may correspond to a smartphone including a local wireless communication circuit, and the external device 402 may correspond to a POS terminal. The electronic devices 401a and 401b and the external device 402 may form, for example, a security channel for a payment transaction process. The electronic devices 401a and 401b may transmit and/or receive data associated with a payment transaction to and/or from the external device 402 through an established security channel.

According to an embodiment of the present disclosure, the electronic device 401a and the external device 402 may communicate with each other through an MST channel. For example, if a user activates an MST module embedded in or externally coupled to the electronic device 401a, the electronic device 401a may generate and emit a magnetic field, which is modulated in a certain scheme to include payment data, by using an activated MST module. Then, if the electronic device 401a comes within a certain distance of an MST reader 412a provided in the external device 402, payment data may be transmitted to the external device 402 through an emitted magnetic field.

In addition, according to an embodiment of the present disclosure, the electronic device 401b and the external device 402 may communicate with each other through an NFC channel. For example, if a user activates an NFC module embedded in or externally coupled to the electronic device 401b, the electronic device 401b may generate and emit an electric field (or electromagnetic field) of a certain frequency (e.g., 13.56 MHz) including payment data, by using the activated NFC module. Then, if the electronic device 401b comes within a certain distance of an NFC reader 412b provided in the external device 402, the payment data may be transmitted to the external device 402 through an emitted electric field (or electromagnetic field).

According to an embodiment of the present disclosure, the external device 402 may complete a payment transaction based on payment data received from the electronic device 401a or the electronic device 401b. For example, the external device 402 may complete a payment transaction by interacting with a mobile payment service server and a payment server of a credit card company and/or a financial institution through an external network (e.g., a POS system network, an Internet, or the like).

Below, a configuration of the electronic device 401a or the electronic device 401b according to an embodiment of the present disclosure is described with reference to FIG. 5, and a payment method is described with reference to FIGS. 6 to 9.

Figure 5:
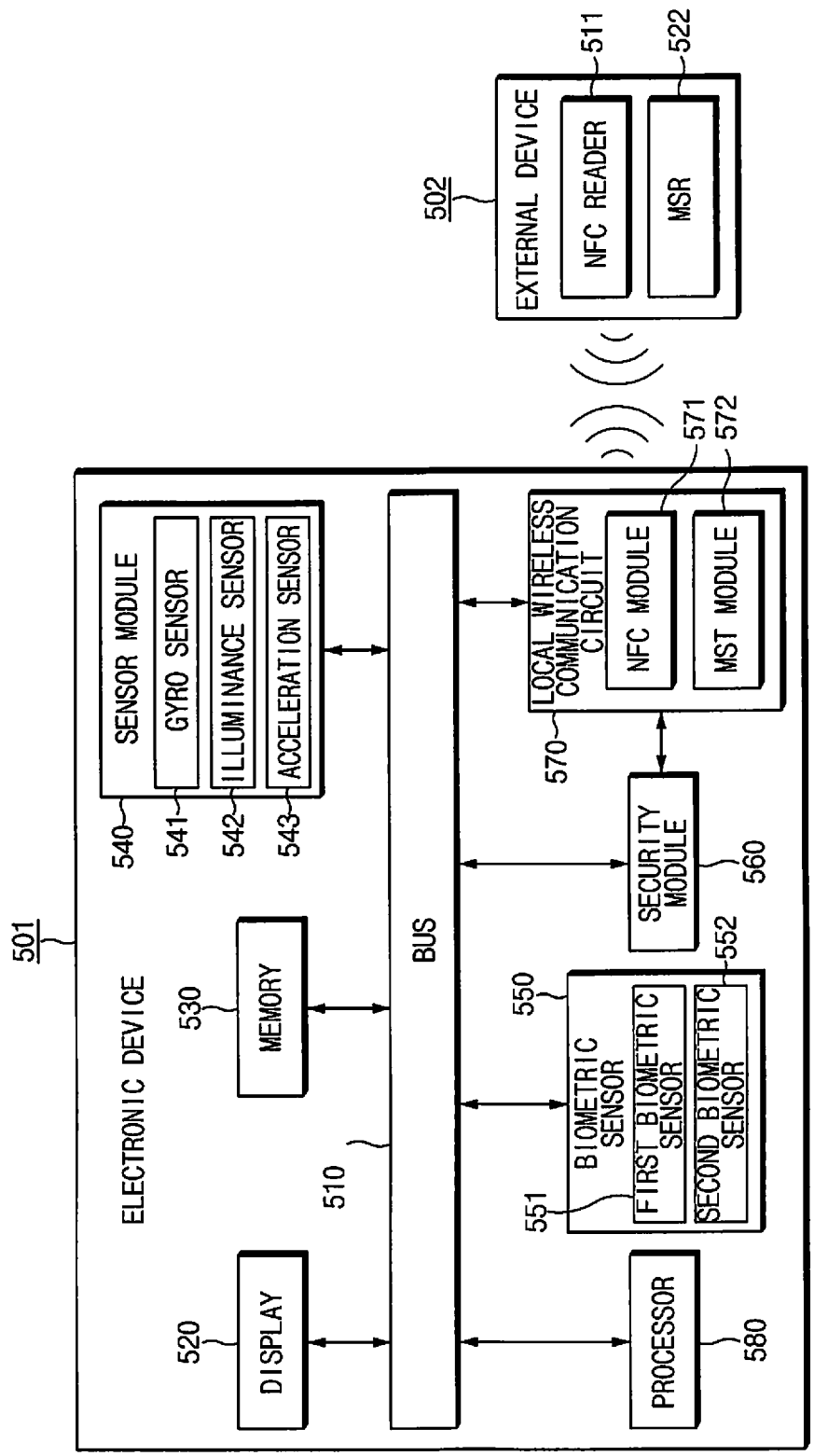
FIG. 5 is a block diagram of an electronic device according to an embodiment of the present disclosure.

FIG. 5 is a block diagram of an electronic device according to an embodiment of the present disclosure.

Referring to FIG. 5, an electronic device 501 for making a payment with an external device 502 (e.g., a POS terminal provided at a merchant, an electronic device supporting a person-to-person payment or person-to-person remittance) may include a bus 510, a display 520, a memory 530, a sensor module 540, a biometric sensor 550, a security module 560, a local wireless communication circuit 570, and/or a processor 580, for example. For example, the electronic device 501 may correspond to each of the electronic devices 401a and 401b illustrated in FIG. 4. In addition, the external device 502 may correspond to the external device 402 of FIG. 4. Descriptions of similar elements described above with reference to FIGS. 1 to 3 are omitted here.

For example, the bus 510 may electrically interconnect the elements 520 to 580 of the electronic device 501. The bus 510 may include a circuit that transfers a communication message (e.g., a control message and/or data) between elements.

According to an embodiment of the present disclosure, the display 520 may display various content (e.g., a text, an image, a video, an icon, an object, a symbol, or the like) under control of the processor 580. The display 520 may include a touch screen and may receive, for example, a touch, a gesture, a proximity input, or a hovering input using an electronic pen or a part of a user's body.

According to an embodiment of the present disclosure, the memory 530 may be electrically connected to the processor 580 and may store commands, information, or data that are associated with operations of the elements 520 and 540 to 580 included in the electronic device 501. For example, the memory 530 may store instructions that, when executed, cause the processor 580 to perform various operations (e.g., refer to FIGS. 6 to 7 described below) disclosed in the present disclosure. After the instructions are implemented with, for example, software such as an application program (e.g., a payment application), an OS, or firmware, the instructions may be stored in the memory 530 or may be embedded in hardware.

According to an embodiment of the present disclosure, the sensor module 540 may measure or sense a physical quantity obtained in the electronic device 501 or in a peripheral environment of the electronic device 501 through a certain interface and may convert the physical quantity into an electrical signal. The sensor module 540 may include a gyro (or gyroscope) sensor 541, an illuminance sensor 542, and an acceleration sensor (or accelerometer) 543. Only the gyro sensor 541, the illuminance sensor 542, and the acceleration sensor 543 are illustrated in FIG. 5 as being included in the sensor module 540. However, like the sensor module 240 of FIG. 2, the sensor module 540 may include a wide variety of sensors.

According to an embodiment of the present disclosure, at least one of the gyro sensor 541 and the acceleration sensor 543 may sense a posture of the electronic device 501. For example, the gyro sensor 541 and/or the acceleration sensor 543 may detect a posture of the electronic device 501 placed on a three-dimensional space and may provide the processor 580 with data of the detection result. The electronic device 501 may sense a posture of the electronic device 501 based on information obtained through the gyro sensor 541, the acceleration sensor 543, and any other sensors.

According to an embodiment of the present disclosure, the illuminance sensor 542 may sense light around the electronic device 501. For example, the illuminance sensor 542 may be implemented with a photo resistor (e.g., a cadmium sulfide cell) in which a resistance value varies with the amount of light. The processor 580 may be provided with information about illuminance (or the amount of light) around the electronic device 501 based on a resistance value varying in a photo resistor of the illuminance sensor 542.

According to an embodiment of the present disclosure, the biometric sensor 550 may detect or receive a biometric feature originated from a user's body. For example, the biometric sensor 550 may detect a biometric feature, convert the detected biometric feature into a digital value, and provide the digital value to the processor 580. The processor 580 may compare the digital value and an authentication value enrolled in the memory 530. The processor 580 may authenticate a legitimate user based on the comparison result. The comparison and user authentication may be made by using a computing resource of a driver IC embedded in the biometric sensor 550.

According to an embodiment of the present disclosure, the biometric sensor 550 may include a plurality of biometric sensors such as a first biometric sensor 551 and a second biometric sensor 552. For example, the plurality of biometric sensors 550 may include biometric sensors such as a fingerprint sensor, an iris sensor, and a vein sensor.

According to an embodiment of the present disclosure, the first biometric sensor 551 may be a fingerprint sensor. The fingerprint sensor may detect a fingerprint of a user. For example, a fingerprint image of a finger may be captured in the fingerprint sensor. The fingerprint sensor may be classified as an optical type, an ultrasonic type, or a capacitive type depending on a physical quantity used to capture the fingerprint image. For example, an area scheme in which a fingerprint is recognized in units of an area or a swipe scheme in which a fingerprint is recognized in units of a line may be applied to the fingerprint sensor.

According to an embodiment of the present disclosure, an IC (a fingerprint sensor IC) embedded in the fingerprint sensor may scan a certain fingerprint detection area. The fingerprint sensor IC may capture a fingerprint image through scanning. For example, the fingerprint sensor IC may extract a unique feature from a fingerprint image, convert the extracted feature into a digital value, and may provide the digital value to the processor 580. For example, the extracted feature, that is, fingerprint minutia may include various minutiae of a fingerprint, such as a ridge ending, a crossover, a bifurcation, a pore, and the like. The processor 580 may compare an extracted feature and a feature (reference biometric information) of a fingerprint stored in advance (advance enrollment) in the memory 530. The processor 580 may authenticate whether a fingerprint including an extracted feature is a fingerprint of a bona fide user, based on the comparison result.

According to an embodiment of the present disclosure, the second biometric sensor 552 may be an iris sensor (or an iris recognition scanner). The iris sensor may analyze wrinkles of an iris of a user and may provide an analysis result to the processor 580.

For example, an iris sensor may include a light source for emitting light (e.g., infrared light) to an iris of a user; a camera for capturing an iris image, which is based on reflected light, from the iris; and an image processing IC for analyzing and encoding minutiae (or a pattern) included in the iris image. The image processing IC may provide an analysis result to the processor 580. According to an embodiment of the present disclosure, a camera for capturing an iris image may be a dedicated iris capturing (infrared) camera or may correspond to a camera disposed on a front surface (a surface on which the display 520 is disposed) of the electronic device 501.

For example, the processor 580 may operate a light source and a camera, which are included in an iris sensor, at a low frame rate. If an image is captured by the camera, the captured image may be transferred to an image processing IC. The image processing IC may determine whether a face of a user is present in the transferred image. In a case where it is determined that the face of the user is present in the transferred image, the image processing IC may report the determination result to the processor 580. The processor 580 may operate the light source and the camera, which are included in the iris sensor, at a high frame rate and may perform an operation for the above-described iris recognition. The processor 580 may compare the recognized feature or pattern and a feature or pattern (reference biometric information) of an iris stored in advance (advance enrollment) in the memory 530. The processor 580 may authenticate whether an iris having the recognized feature or pattern is an iris of a legitimate user, based on the comparison result.

According to an embodiment of the present disclosure, the security module 560 may correspond, for example, to a storage area protected by an algorithm. The security module 560 may be connected to the local wireless communication circuit 570 through the bus 510 or directly. The security module 560 may store payment information corresponding to a payment card. For example, payment information may include at least one of a primary account number (PAN) of a credit card linked with a financial account, a token, a one-time token (OTT), or a cryptogram used to replace at least part of the PAN. For example, the token may comply with the Europay Mastercard and Visa (EMV) tokenization standard.

According to an embodiment of the present disclosure, the security module 560 may be implemented with, for example, a secure element (SE), an embedded SE (eSE), a universal IC card (UICC), an embedded UICC (eUICC), a micro secure digital (SD) card, a SIM card, a trust zone being storage (or memory) safely protected from unauthorized access, and the like.

According to an embodiment of the present disclosure, the local wireless communication circuit (or near-distance wireless communication circuit) 570 may wirelessly transmit payment information to the external device 502. For example, the local wireless communication circuit 570 may transmit payment information stored in the security module 560 to the external device 502 through a certain wireless channel (e.g., an NFC channel, an MST channel, or the like). For another example, the local wireless communication circuit 570 may receive payment information (e.g., an OTT) generated through interaction between a mobile payment service server and a payment server of a credit card company for every payment transaction and may transmit the received payment information to the external device 502 through a certain wireless channel (e.g., an NFC channel, an MST channel, or the like).

The local wireless communication circuit 570 is illustrated in FIG. 5 as being embedded in the electronic device 501. However, according to an embodiment of the present disclosure, the local wireless communication circuit 570 may be implemented with a dedicated device (or accessory) and may be electrically coupled with the electronic device 501 through a certain interface (e.g., a 3.5 mm earphone terminal, a USB terminal, or the like).

According to an embodiment of the present disclosure, the local wireless communication circuit 570 may include an NFC module 571 and an MST module 572. The local wireless communication circuit 570 is described above with reference to FIG. 5 as including the NFC module 571 and the MST module 572, but the present disclosure is not limited thereto. For example, the local wireless communication circuit 570 may include an RFIC tag.

According to an embodiment of the present disclosure, the NFC module 571 may include, for example, an NFC controller (or an NFC driver) and an RF module driven by the NFC controller. The NFC controller may convert payment data stored in the security module 560 into an electrical signal and may transfer the electrical signal to the RF module. The RF module may transmit and receive payment data or any other data to and from the external device 502 in an electromagnetic induction manner, based on the electrical signal received from the NFC controller, for example.

According to an embodiment of the present disclosure, the MST module 572 may include, for example, an MST controller (or an MST driver) and an inductor driven by the MST controller. The MST controller may convert payment data stored in the security module 560 into an electrical signal (e.g., a stream of pulses) and may transfer the electrical signal to the inductor. The inductor may generate magnetic field fluctuations (e.g., magnetic pulses) modulated in a certain scheme based on the electrical signal received from the MST controller and may transmit payment data or any other data to the external device 502 through the magnetic field fluctuations. The MST module 572 may be referred to as a magnetic secure transmission module or a magnetic stripe transmission module.

According to an embodiment of the present disclosure, the processor 580 may be electrically connected to the elements 510 to 550 included in the electronic device 501, for example, and may execute operations or data processing associated with control and/or communication of the elements 510 to 550 included in the electronic device 501.

According to an embodiment of the present disclosure, the processor 580 may execute (or launch) a payment application (e.g., Samsung Pay®, Apple Pay®, or the like) for a payment transaction. A certain GUI may be output in the display 520 by the execution of the payment application.

According to an embodiment, the processor 580 may initiate the payment transaction with the external device 502 in response to a certain event. For example, the certain event may include a user input through the GUI output in the display 520 or a payment start signal (e.g., an NFC signal) received from the external device 502 when the electronic device 501 approaches the external device 502.

According to an embodiment of the present disclosure, if a payment transaction is initiated, the processor 580 may select at least one of the first biometric sensor 551 or the second biometric sensor 552, based on a security policy of an issuer of a payment card or a security policy of the payment card itself. Then, the processor 580 may authenticate a user by using the selected biometric sensor; if the authentication is successful, the processor 580 may transmit the payment information corresponding to the payment card to the external device 502 through the local wireless communication circuit 570.

For example, according to a security policy of credit card company A (an example of a payment card issuer), a payment transaction using all (mobile) payment cards issued by the credit card company A may demand to authenticate a user by using both the first biometric sensor 551 and the second biometric sensor 552.

For example, according to a security policy of credit card company B, a payment transaction using a (mobile) credit card "X" issued by credit card company B may demand to authenticate a user by using the first biometric sensor 551. In contrast, a payment transaction using a (mobile) credit card "Y" issued by credit card company B may demand to authenticate a user by using the second biometric sensor 552.

According to an embodiment of the present disclosure, information associated with a security policy of a payment card issuer and a security policy of a payment card may be stored in the security module 560 or the memory 530, for example, when the payment application (e.g., Samsung Pay® or Apple Pay®) is installed or updated in the electronic device 501. For example, information associated with the security policy of the payment card issuer and the security policy of the payment card may be stored in the security module 560 or the memory 530, for example, in a payment card enrollment process (refer to FIG. 10) using the payment application.

According to an embodiment of the present disclosure, in a case where user authentication fails, the processor 580 may count the number of times authentication fails at the first biometric sensor 551 and the number of times authentication fails at the second biometric sensor 552. If the number of authentication failures exceed a certain count (e.g., five times), the processor 580 may proceed to another authentication procedure. In this case, the other authentication procedure may include an authentication procedure using a personal identification number (PIN) or a back-up password, a touch pattern, or the like.

According to an embodiment of the present disclosure, a user may set a security policy to be applied to a payment transaction by using a configuration setting menu of a payment application. For example, a user may specify a biometric sensor (the first biometric sensor 551 and/or the second biometric sensor 552) to be used for the payment transaction. In this case, if a security policy set by the user conflicts with a security policy of a payment card issuer or a security policy of a payment card, the processor 580 may select at least one of the first biometric sensor 551 or the second biometric sensor 552, based on the security policy of the payment card issuer or the security policy of the payment card. That is, the processor 580 may preferentially apply the security policy of the payment card issuer or the security policy of the payment card rather than settings of the user.

According to an embodiment of the present disclosure, the security policy of the payment card issuer or the security policy of the payment card may be absent, or a biometric sensor to be used for user authentication in a payment transaction may not be specified in advance. In this case, the processor 580 may select at least one of the first biometric sensor 551 or the second biometric sensor 552, based on information obtained from a peripheral environment of the electronic device 501. In addition, even though biometric sensors used for user authentication are designated in advance, the processor 580 may select one biometric sensor consuming relatively low power based on information obtained from a surrounding environment of the electronic device 501.

For example, the processor 580 may select at least one of the first biometric sensor 551 or the second biometric sensor 552, based on information associated with a posture of the electronic device 501 sensed in the gyro sensor 541 and/or the acceleration sensor 543. For example, the information associated with the posture of the electronic device 501 sensed in the gyro sensor 541 and/or the acceleration sensor 543 may include information associated with a slope of the electronic device 501 to the ground. In this case, if the slope is less than a certain angle, for example, the processor 580 may select the first biometric sensor 551; if the slope is not less than the certain angle, the processor 580 may select the second biometric sensor 552. The reason is that, in general, in a case where user authentication is made by using the iris sensor (an example of the second biometric sensor 552), the user may stand and grip the electronic device 501 to be perpendicular to the ground; in a case where user authentication is made by using a fingerprint sensor (an example of the first biometric sensor 551), the user may grip the electronic device 501 to be parallel with the ground or to make an acute angle with the ground (refer to FIG. 9).

For example, if an amount of light sensed in the illuminance sensor 542 is less than a certain value, the processor 580 may select the first biometric sensor 551; if the amount of light sensed in the illuminance sensor 542 is not less than the certain value, the processor 580 may select the second biometric sensor 552. The reason is that, in general, user authentication using the iris sensor may be conducted only when the amount of light obtained from the periphery of the electronic device 501 is not less than a certain level.

For example, the processor 580 may select the second biometric sensor 552 in a case where it is sensed that a foreign material (e.g., water) is attached to the first biometric sensor 551 (e.g., the fingerprint sensor). In contrast, for example, the processor 580 may select the first biometric sensor 551 in a case where it is sensed that a foreign material is attached to the second biometric sensor 552 (e.g., the iris sensor). That is, in a case where any biometric sensor is in an inappropriate condition for the user authentication or in a case where the number of times that the user authentication using any biometric sensor fails is not less than a certain count, the processor 580 may be configured to perform user authentication using the other biometric sensor.

According to an embodiment of the present disclosure, the processor 580 may select at least one of the first biometric sensor 551 or the second biometric sensor 552, based on a height of the electronic device 501 from the ground or an arrangement of a hand/fingers gripping the electronic device 501 (by using a grip sensor).

The above-described operations of the processor 580 are merely examples, and the present disclosure is not limited thereto. For example, operations of a processor described in the present disclosure are intended to be understood as operations of the processor 580. In addition, at least some of the operations described as operations of an electronic device are intended to be understood as operations of the processor 580.

The external device 502 may include, for example, a POS terminal installed in a member store or an electronic device supporting a person-to-person payment or person-to-person remittance. The external device 502 may complete a payment transaction based on payment information received from the electronic device 501.

According to an embodiment of the present disclosure, the external device 502 may include a module that wirelessly transmits or receives payment information to or from the electronic device 501. For example, the external device 502 may include an NFC reader 511 corresponding to the NFC module 571 of the electronic device 501 and/or an MSR (magnetic stripe reader or magnetic secure reader) 522 corresponding to the MST module 572 of the electronic device 501. The external device 502 may further include a communication circuit for connection with a network, a processor for processing a payment transaction, and the like in addition to the above-described elements.

According to an embodiment of the present disclosure, the NFC reader 511 may transmit and receive data associated with a payment transaction to and from the electronic device 501 in an electromagnetic induction manner. For example, the NFC reader 511 may restore the payment data received from the NFC module 571 of the electronic device 501 to an electrical signal and may perform and complete a payment transaction process based on the electrical signal.

According to an embodiment of the present disclosure, the MSR 522 may receive data associated with a payment transaction by detecting magnetic field fluctuations generated by the MST module 572 of the electronic device 501. For example, the MSR 522 may restore the payment data received from the MST module 572 of the electronic device 501 to an electrical signal and may perform and complete a payment transaction process based on the electrical signal.

According to an embodiment of the present disclosure, the external device 502 may complete a payment transaction by interacting with a mobile payment service server and a payment server of a credit card company and/or a financial institution through an external network (e.g., a POS system network, an Internet, or the like). For example, the mobile payment service server may include a server (e.g., a TSP server) that manages a token associated with a payment application. In addition, for example, the payment server of the credit card company and/or the financial institution may include a server (e.g., a TSM server) that manages a financial account of the user.

Figure 6:
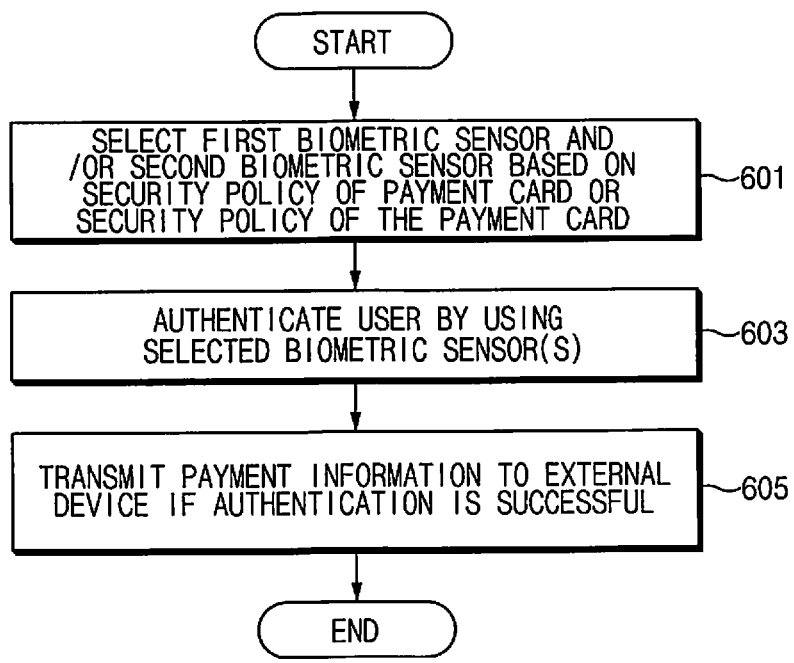
FIG. 6 is a flowchart of a payment method according to an embodiment of the present disclosure.

FIG. 6 is a flowchart of a payment method according to an embodiment of the present disclosure.

Referring to FIG. 6, the payment method may include operations 601, 603, and 605. Operations 601, 603, and 605 may be performed by, for example, the electronic device 501 illustrated in FIG. 5. Operations 601, 603, and 605 may be respectively implemented with, for example, instructions that are capable of being performed (or executed) by the processor 580 of the electronic device 501. The instructions may be stored in, for example, a non-transient computer-readable recording medium or the memory 530 of the electronic device 501 illustrated in FIG. 5. Hereinafter, the reference numerals of FIG. 5 may be used to describe operations 601, 603, and 605, and descriptions of elements that are the same as described above with reference to FIG. 5 may be omitted here.

In operation 601, the processor 580 of the electronic device 501 may select at least one of the first biometric sensor 551 or the second biometric sensor 552, based on a security policy of an issuer of a payment card or a security policy of the payment card.

For example, according to a security policy of credit card company A, a payment transaction using all (mobile) payment cards issued by credit card company A may demand to authenticate a user by using both the first biometric sensor 551 and the second biometric sensor 552. For example, according to a security policy of credit card company B, a payment transaction using a (mobile) credit card "X" issued by credit card company B may demand to authenticate the user by using the first biometric sensor 551. In addition, a payment transaction using a (mobile) credit card "Y" issued by credit card company B may demand to authenticate the user by using the second biometric sensor 552.

In operation 603, the processor 580 may authenticate the user by using the biometric sensor(s) selected in operation 601.

For example, in a case where a payment transaction is performed by using all the (mobile) payment cards issued by credit card company A, the processor 580 may activate both the first biometric sensor 551 and the second biometric sensor 552. The user may perform user authentication by using the first biometric sensor 551 and the second biometric sensor 552, respectively. For, in a case where a payment transaction is performed by using the payment card "X" issued by credit card company B, only the first biometric sensor 551 may be activated. The user may perform user authentication by using the first biometric sensor 551. In addition, in a case where a payment transaction is performed by using the payment card "Y" issued by credit card company B, only the second biometric sensor 552 may be activated. The user may perform user authentication by using the second biometric sensor 552.

If the authentication of operation 603 is successful, in operation 605, the processor 580 may transmit payment information corresponding to the payment card to the external device 502 through the local wireless communication circuit 570.

Figure 7:
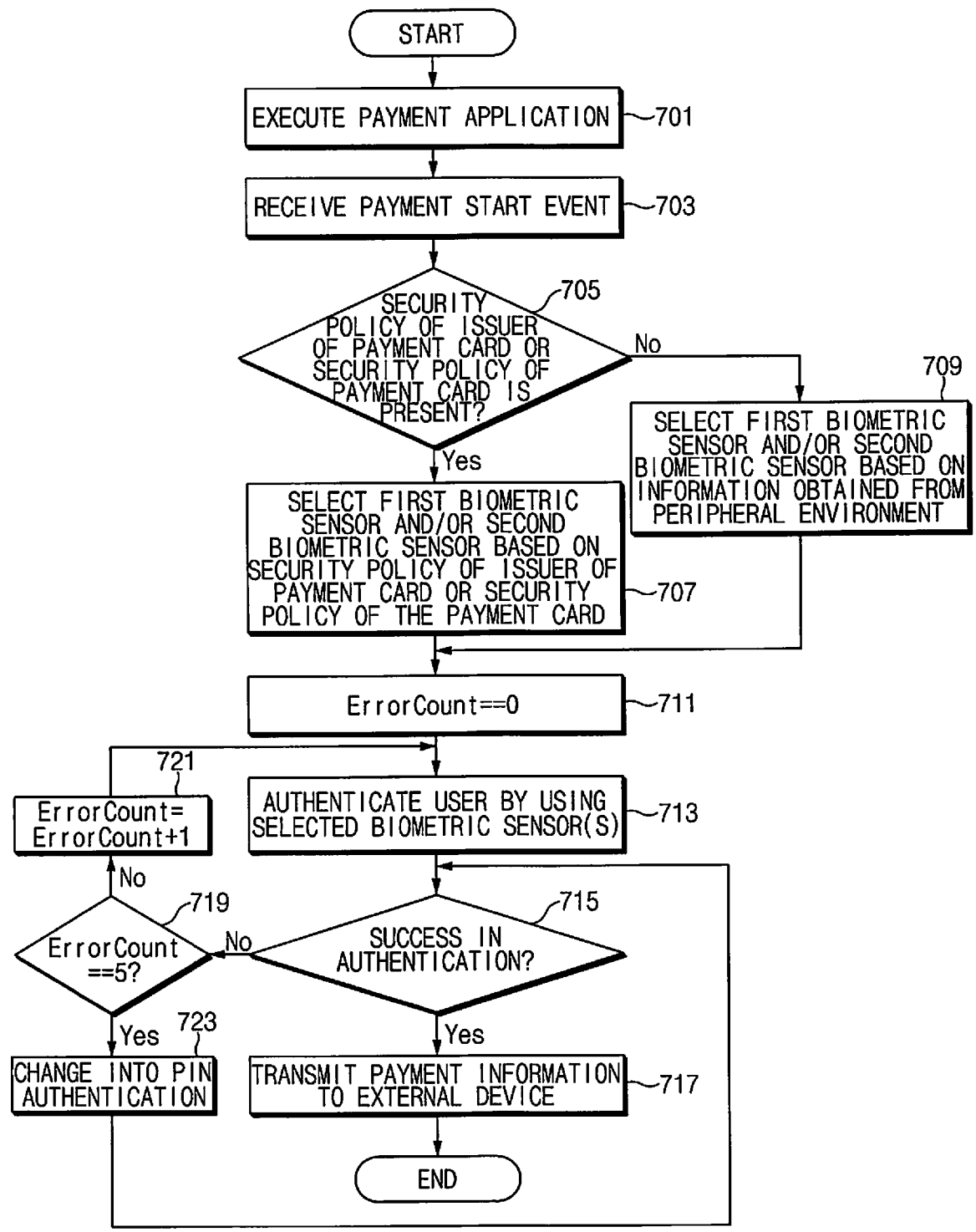
FIG. 7 is a flowchart of a payment method according to an embodiment of the present disclosure.

FIG. 7 is a flowchart of a payment method according to an embodiment of the present disclosure.

Referring to FIG. 7, the payment method may include operations 701 to 723. Operations 701 to 723 may be executed by, for example, the electronic device 501 illustrated in FIG. 5. Operations 701 to 723 may be respectively implemented with, for example, instructions that are capable of being performed (or executed) by the processor 580 of the electronic device 501. The instructions may be stored in, for example, a non-transitory computer-readable recording medium or the memory 530 of the electronic device 501 illustrated in FIG. 5. Hereinafter, the reference numerals of FIG. 5 may be used to describe operations 701 to 723, and a description that is the same as described above with reference to FIG. 6 may be omitted here.

In operation 701, the processor 580 of the electronic device 501 may execute or launch a payment application. A GUI for a payment transaction may be output in the display 520 by the execution of the payment application.

In operation 703, the processor 580 may detect an event associated with initiation of the payment transaction. For example, the event may include a user input (e.g., a touch on a certain object (e.g., 811 of FIG. 8)) through the GUI output in the display 520 or a payment start signal (e.g., an NFC signal) received from the external device 502 when the electronic device 501 approaches the external device 502.

In operation 705, the processor 580 may determine whether a security policy of a payment card issuer or a security policy of a payment card itself is present. For example, the processor 580 may perform operation 705 with reference to a security policy of a payment card issuer or a security policy of a payment card itself stored in the memory 530 or the security module 560. If the security policy of the payment card issuer or the security policy of the payment card itself is present, the processor 580 may proceed to operation 707; if not, the processor 580 may proceed to operation 709.

In operation 707, the processor 580 may select the first biometric sensor 551 and/or the second biometric sensor 552, based on a security policy of an issuer of a payment card to be used for a payment transaction or a security policy of the payment card. For example, the processor 580 may select the first biometric sensor 551 and/or the second biometric sensor 552, based on the security policy of the payment card issuer or the security policy of the payment card stored in the memory 530 or the security module 560.

If the security policy of the payment card issuer or the security policy of the payment card is absent, in operation 709, the processor 580 may select the first biometric sensor 551 and/or the second biometric sensor 552, based on information obtained from a peripheral environment of the electronic device 501.

According to an embodiment of the present disclosure, the processor 580 may select at least one of the first biometric sensor 551 or the second biometric sensor 552, based on information associated with a posture of the electronic device 501 sensed in the gyro sensor 541 and/or the acceleration sensor 543. For example, the information associated with the posture of the electronic device 501 sensed in the gyro sensor 541 and/or the acceleration sensor 543 may include information associated with a slope of the electronic device 501 to the ground. In this case, if the slope is less than a certain angle, for example, the processor 580 may select the first biometric sensor 551; if the slope is not less than the certain angle, the processor 580 may select the second biometric sensor 552.

For example, if the amount of light sensed in the illuminance sensor 542 is smaller than a certain value, the processor 580 may select the first biometric sensor 551; if the amount of light sensed in the illuminance sensor 542 is not less than the certain value, the processor 580 may select the second biometric sensor 552.

For example, the processor 580 may select the second biometric sensor 552 in the case where it is sensed that a foreign material (e.g., water) is attached to the first biometric sensor 551. In contrast, for example, the processor 580 may select the first biometric sensor 551 in the case where it is sensed that a foreign material is attached to the second biometric sensor 552.

According to an embodiment of the present disclosure, the processor 580 may select at least one of the first biometric sensor 551 or the second biometric sensor 552, based on a height of the electronic device 501 from the ground or the arrangement of a hand/fingers gripping the electronic device 501.

In operation 711, the processor 580 may set a payment fail count ErrorCount to "0".

In operation 713, the processor 580 may authenticate the user through the biometric sensor(s) selected in operation 707 or operation 709 or through PIN authentication selected in operation 723.

In operation 715, the processor 580 may determine whether the authentication of operation 713 is successful. If it is determined that the authentication is successful in operation 713, the procedure may proceed to operation 717; otherwise, the procedure may proceed to operation 719.

If it is determined in operation 715 that the authentication of operation 713 is successful, in operation 717, the processor 580 may transmit payment information corresponding to the payment card to the external device 502 by using the local wireless communication circuit 570. For example, the payment information may be transmitted through an MST channel to the external device 502 in the format of a magnetic field signal or may be transmitted through the MST channel to the external device 502 in the format of an electromagnetic field signal.

If it is determined in operation 715 that the authentication of operation 713 fails, in operation 719, the processor 580 may determine whether the payment fail count ErrorCount reaches a certain count. For example, the certain count may be "5". If it is determined that the payment fail count ErrorCount reaches the certain count, the processor 580 may proceed to operation 723; otherwise, the processor 580 may proceed to operation 721.

In operation 721, the processor 580 may increase the payment fail count ErrorCount by "1". That is, the payment fail count ErrorCount may increase by "1" whenever the authentication of operation 713 fails. Then, the processor 580 returns to operation 713 to perform the user authentication again.

In operation 723, the processor 580 may authenticate the user by using any other authentication procedure because the payment fail count ErrorCount reaches the certain count (e.g., 5). In this case, the other authentication procedure may include the PIN authentication.

According to an embodiment of the present disclosure, unlike in FIG. 5, operation 723 may be omitted. That is, in a case where the payment fail count ErrorCount reaches the certain count (e.g., 5), the payment method may end.

Figure 8:
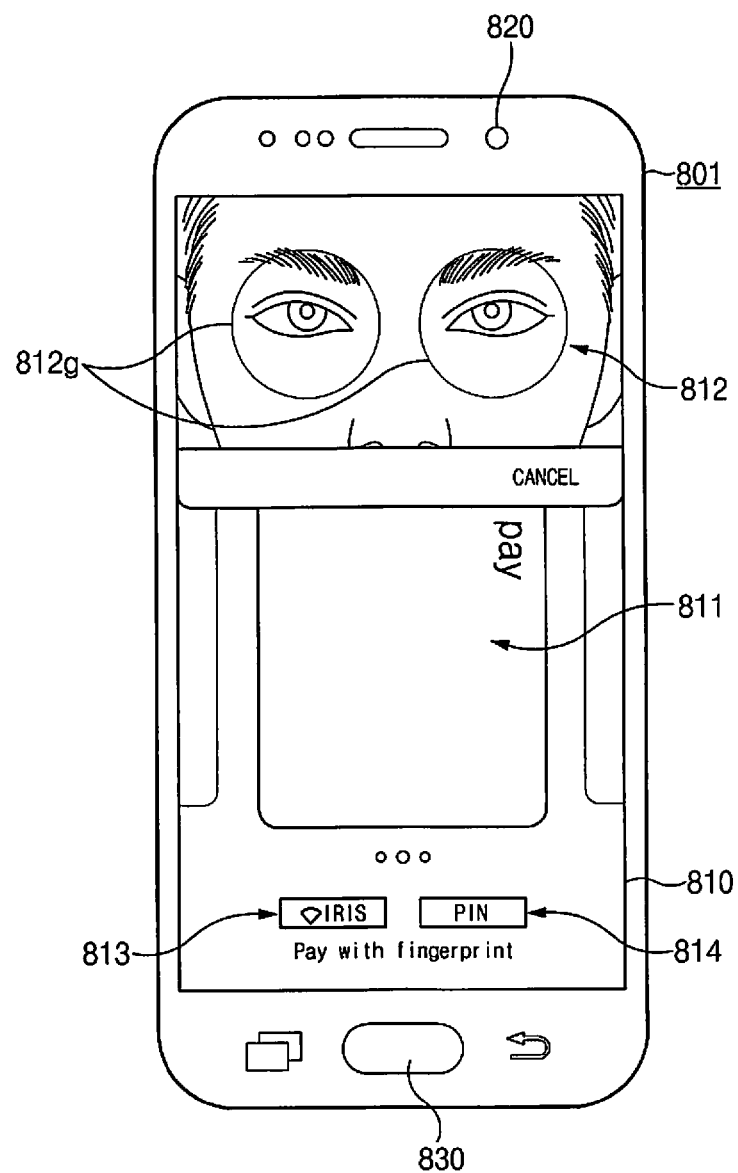
FIG. 8 is a diagram of a graphical user interface (GUI) of a payment application according to an embodiment of the present disclosure.

FIG. 8 is a diagram of a GUI screen 810 of a payment application according to an embodiment of the present disclosure.

Referring to FIG. 8, an electronic device 801 that outputs, in a display, the GUI screen 810 indicating user authentication using an iris sensor is illustrated. The electronic device 801 may include the display outputting the GUI screen 810, an iris sensor 820, and a physical button 830 (e.g., a home button) including a fingerprint sensor. For example, the electronic device 801 may output the GUI screen 810 in the display when operation 603 of FIG. 6 or operation 713 of FIG. 7 is performed.

According to an embodiment of the present disclosure, the GUI screen 810 may include an image 811 indicating a payment card, a guide image 812 for iris authentication, a function object 813 for initiating the iris authentication, a function object 814 for initiating PIN authentication, and the like.

For example, the electronic device 801 may initiate iris authentication depending on a security policy of an issuer of a payment card to be used for a payment transaction or a security policy of the payment card or may initiate iris authentication based on information obtained from a peripheral environment of the electronic device 801. For example, the electronic device 801 may initiate iris authentication if the function object 813 is selected by a user input (e.g., a touch or the like).

If iris authentication is initiated, the electronic device 801 may activate the iris sensor 820 and may output the guide image 812 for iris authentication in the display. The guide image 812 for the iris authentication may include, for example, a guide 812g for indicating locations where eyes of the user are disposed. For example, to perform iris authentication, a user may allow his/her face to be spaced apart from the electronic device 801 by about 30 cm and may align the user's eyes with the guide 812g included in the guide image 812. Iris authentication may be performed through the above-described procedure. In addition, the user may stop or disable iris authentication by selecting a certain GUI object (e.g., a button or the like) before or during iris authentication.

In addition, for example, the electronic device 801 may initiate fingerprint authentication depending on a security policy of an issuer of a payment card to be used for a payment transaction or a security policy of the payment card or may initiate fingerprint authentication based on information obtained from a peripheral environment of the electronic device 801. For example, the electronic device 801 may initiate fingerprint authentication if a notice (e.g., "Pay with fingerprint") informing fingerprint authentication-based payment is output in the display. If fingerprint authentication is initiated, the electronic device 801 may activate the fingerprint sensor included in the home button 830 to perform fingerprint authentication.

According to an embodiment of the present disclosure, in a case where iris authentication or fingerprint authentication is not available or in a case where the number of times that authentication fails is not less than a certain count, the electronic device 801 may be configured to perform any other authentication procedure. For example, another authentication procedure may include a PIN authentication procedure. The electronic device 801 may change the authentication procedure to the PIN authentication procedure immediately depending on a user input associated with the function object 814 output in the display.

Figure 9:
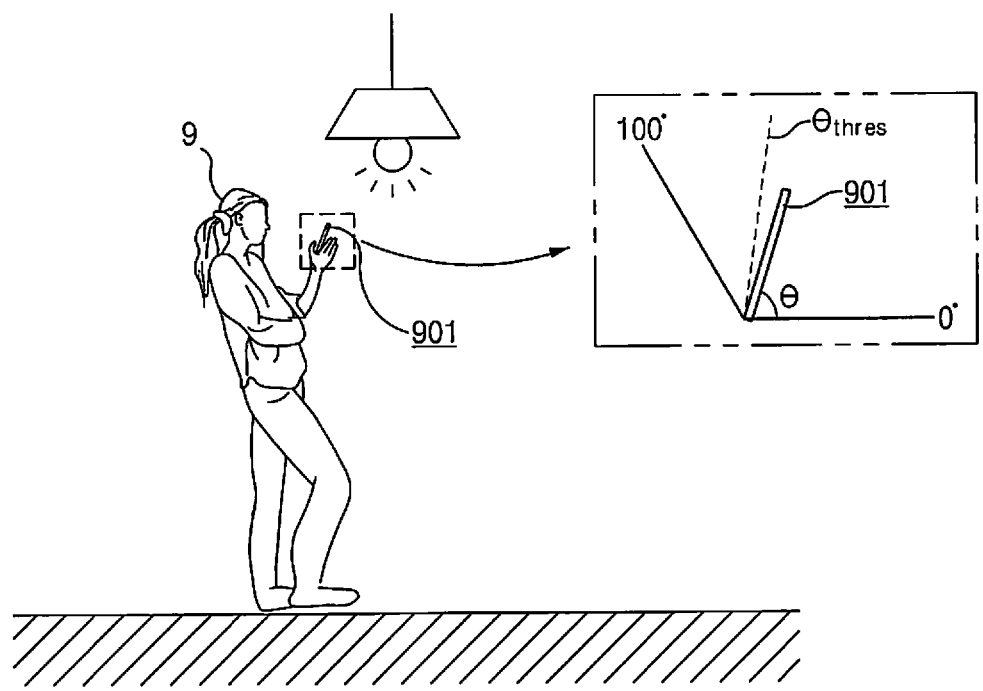
FIG. 9 is a diagram of an environment in which an electronic device according to an embodiment of the present disclosure is used.

FIG. 9 is a diagram of an environment in which an electronic device according to an embodiment of the present disclosure is used.

Referring to FIG. 9, a user 9 may grip an electronic device 901 and may perform iris authentication or fingerprint authentication for a payment transaction. According to an embodiment of the present disclosure, the electronic device 901 may select iris authentication or fingerprint authentication based on information obtained from a peripheral environment of the electronic device 901.

According to an embodiment an embodiment of the present disclosure, the electronic device 901 may select iris authentication and/or fingerprint authentication based on a slope of the electronic device 901 to the ground, which is sensed in an embedded gyro sensor and/or acceleration sensor. For example, the electronic device 901 may select iris authentication if the slope is not less than a certain angle $\theta_{thres}$ and may select fingerprint authentication if the slope is less than the certain angle $\theta_{thres}$. In general, in a case where a user performs iris authentication, the user may stand and grip the electronic device 901 to be approximately perpendicular to the ground (e.g., 100° to 80°); in a case where the user performs fingerprint authentication, the user may grip the electronic device 901 to be parallel with the ground or to make an acute angle with the ground (e.g., 0° to 80°).

For example, if the amount of light sensed in an embedded illuminance sensor is less than a certain value, the electronic device 901 may select fingerprint authentication; if the amount of light sensed in the embedded illuminance sensor is not less than the certain value, the electronic device 901 may select iris authentication. The reason is that, in general, iris authentication may be conducted only when the amount of light obtained from the periphery of the electronic device 901 is not less than a certain level.

In addition, according to an embodiment of the present disclosure, in a case where any biometric sensor is in an inappropriate condition for user authentication or in the case where the number of times that the user authentication fails using any biometric sensor is not less than a certain count, the electronic device 901 may be configured to perform user authentication by using the other biometric sensor.

In addition, the electronic device 901 may select iris authentication and/or fingerprint authentication, based on a height of the electronic device 901 from the ground or an arrangement of a hand/fingers gripping the electronic device 901. Furthermore, in reference to the accompanying drawings of the present disclosure including FIG. 9, biometric authentication is described above as including iris authentication and fingerprint authentication. However, the present disclosure is not limited thereto. For example, biometric authentication may include any existing biometric authentication, such as vein authentication, voice authentication, facial authentication, and the like, and any biometric authentication developed in the future.

Figure 10:
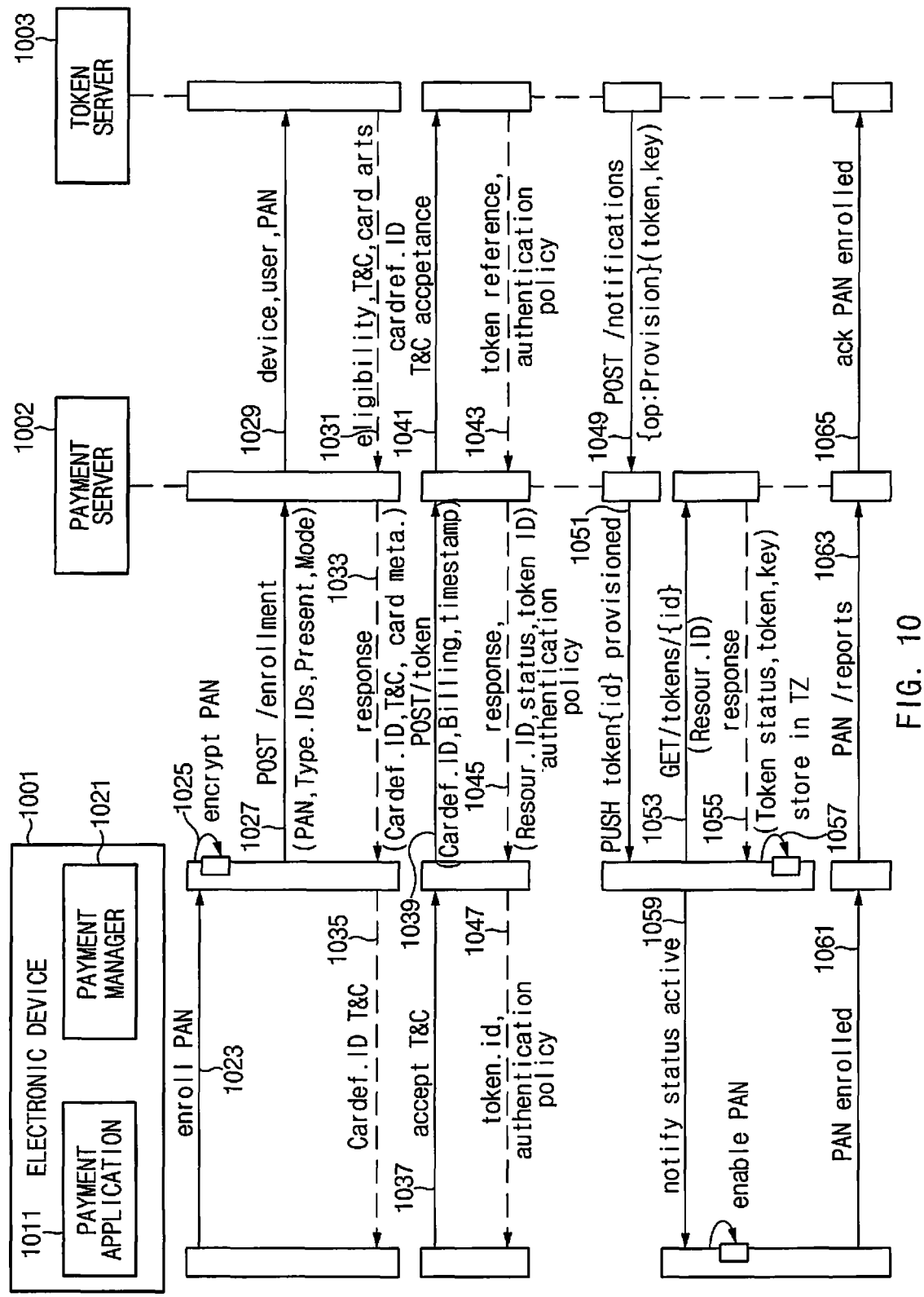
FIG. 10 is a flow diagram of a payment card enrollment process according to an embodiment of the present disclosure.

FIG. 10 is a flow diagram of a payment card enrollment process according to an embodiment of the present disclosure.

Referring to FIG. 10, a solid line may represent a request (e.g., a request or call) command, and a dotted line may represent a response (e.g., a response or return) command. According to an embodiment of the present disclosure, the payment card enrollment process may be performed between an electronic device 1001, a payment server 1002, or a token server 1003. The electronic device 1001 may include, for example, a payment application 1011 and/or a payment manager 1021.

According to an embodiment of the present disclosure, the electronic device 1001 may store information to be used for a payment through a sensor (e.g., an image sensor, a camera, or the like), an optical character reader (OCR), and/or a user input. For example, the information to be used for the payment may include card information (e.g., PAN), a validity period, a card verification value (CVV), or a user name. The electronic device 1001 may execute the payment application 1011. The PAN may include an account number associated with a bank identification number (BIN) generated from a financial server.

According to an embodiment of the present disclosure, the electronic device 1001 may store information, which is capable of being used for a payment associated with the payment application 1011, in the electronic device 1001 or an external device. For example, the electronic device 1001 may store information, which is capable of being used for a payment corresponding to the payment application 1011, in a memory included in the electronic device 1001 or in an external device (e.g., the first external electronic device 102, the second external electronic device 104, or the server 106 of FIG. 1).

According to an embodiment of the present disclosure, the electronic device 1001 may enroll a PAN in operation 1023 by using the payment application 1011. For example, the electronic device 1001 may transfer the PAN to the payment application 1011. The payment manager 1021 may transfer the PAN, which is input to the electronic device 1011 through a sensor, to the payment application 1011.

According to an embodiment of the present disclosure, the payment manager 1021 may encrypt the PAN in operation 1025. For example, the payment manager 1021 may encrypt the PAN by using a key included in a certain security application to protect the PAN. In addition, for example, the payment manager 1021 may encrypt the PAN by using information generated at the electronic device 1011 or information received from the external device (e.g., a server or a financial server).

According to an embodiment of the present disclosure, the payment manager 1021 may enroll the encrypted PAN in the payment server 1002 in operation 1027. For example, the payment manager 1021 may be operatively connected with the payment server 1002 to transfer the encrypted PAN thereto. The encrypted PAN may be transferred through a secure channel secured against the outside. For example, the payment manager 1021 may use a certain command (e.g., POST/enrollment) upon enrolling the PAN in the payment server 1002. In addition, the payment server 1002 may control, for example, the encrypted PAN through a token requester server included in the payment server 1002.

According to an embodiment of the present disclosure, the POST/enrollment that is the certain command may be used when the payment manager 1021 makes a request to the payment server 1002 for card enrollment. A parameter of the POST/enrollment may include, for example, at least one of a type, an entry, a token requester identity (ID), a user ID, an application or app ID, a device ID, a card reference ID, a device name, a device profile, device certificates for encryption and signing, a device pair, a payment instrument, or a presentation mode. The type may include, for example, a name (e.g., a payment account brand) of a company issuing a payment card. The name of the company issuing the payment card may include, for example, at least one of Visa®, Mastercard®, American Express®, or Discover®.

The entry may include, for example, a card entry method. The card entry method may include, for example, at least one of MANUAL, OCR, APP, or FILE. The device profile may include, for example, a type (e.g., an electronic device, a wearable device, or the like) of an electronic device. The payment instrument may include, for example, payment information (e.g., a PAN, an expiration date (or expiration data and expire date), a CVV, and the like). The presentation mode may include, for example, a payment method (e.g., MST or NFC) to be used for payment.

According to an embodiment of the present disclosure, the payment server 1002 may transfer user information to the token server 1003 in operation 1029. For example, the user information may include a device profile, a user ID, an app ID, a card reference ID. The device profile may include, for example, a device ID (e.g., an international mobile equipment identity (IMEI) or a random value for specifying a device) and/or a payment means (e.g., NFC and/or MST). The user ID may include, for example, a name of a user who uses the electronic device. The app ID may include, for example, an identifier of the payment application 1011. The card reference ID may include, for example, an identifier of a card to be enrolled in the electronic device 1001. The card reference ID may be distinguishable from the PAN and may be a value specified to manage a card.

According to an embodiment of the present disclosure, the token server 1003 may establish a channel (e.g., a session) between the payment server 1002 and the token server 1003 in response to receiving user information. The channel may encrypt information or data, which are to be transmitted or received through the channel, by using a public key that the payment server 1002 and the token server 1003 share.

According to an embodiment of the present disclosure, the payment server 1002 may transfer the PAN (e.g., an encrypted PAN) to the token server 1003 by using a channel established between the payment server 1002 and the token server 1003.

According to an embodiment of the present disclosure, the token server 1003 may enroll the PAN received from the payment server 1002. In the enrollment process, whether it is possible to issue a token may be verified by using one or more IDs among the user ID, the app ID, the device ID, or the card reference ID. For example, the token server 1003 may verify whether it is possible for a card to issue a token, by using the card reference ID. The token server 1003 may verify whether a user or a device is an enrolled user or an enrolled device using a device ID and a user ID. The token server 1003 may enroll a PAN received from the payment server 1002 and may transfer a response (e.g., enrollment) to the enrollment to the payment server 1002 in operation 1031. The response to the enrollment may include, for example, at least one of a card reference ID, terms of a contract, card metadata, or issuer metadata.

According to an embodiment of the present disclosure, the payment server 1002 may transfer information received from the token server 1003, e.g., the response to the enrollment, to the payment manager 1021 in operation 1033. The payment manager 1021 may then transfer the information to the payment application 1011 in operation 1035. The response to the enrollment may include, for example, at least one of a card reference ID, terms of a contract, card metadata, or issuer metadata. The card metadata may include the type, for example, a name (e.g., a payment account brand) of a company issuing a payment card. The card metadata may include, for example, card art. The card art may be art that is the same as and/or similar to art on an actual card or a virtual card. The issuer metadata may include, for example, at least one of a name or a logo of a financial server.

According to an embodiment of the present disclosure, at least part of the response to a PAN enrollment (e.g., POST/enrollment) may be information stored in the payment server 1002 and/or the payment manager 1021 and may be changed (e.g., generated, revised, or deleted) according to a certain condition.

According to an embodiment of the present disclosure, the payment application 1011 may output at least part of the response to the enrollment received from the payment manager 1021 externally by using an output device. For example, the payment application 1011 may output the terms of a contract included in a response to an enrollment in the display.

According to an embodiment of the present disclosure, the payment application 1011 may receive a command associated with the terms of a contract through an input (e.g., a user input). For example, the payment application 1011 may receive a command (e.g., accept) permitting the terms of a contract in operation 1037.

According to an embodiment of the present disclosure, the payment manager 1021 may transfer, to the payment server 1002, information corresponding to the command permitting the terms of a contract in operation 1039. The information may include, for example, a certain command (e.g., POST/tokens). The information corresponding to the command permitting the terms of a contract may be information associated with a time when an input is received.

According to an embodiment of the present disclosure, the POST/tokens may be used when the payment manager 1021 requests a token after verifying (e.g., accept) a user associated with the terms of a contract while a card is enrolled in the payment server 1002. A parameter of the POST/tokens may include, for example, at least one of a card reference ID, acceptance of terms of a contract (e.g., terms and conditions (T&C) acceptance), or a timestamp. The timestamp may include, for example, a time when the command permitting the terms of a contract is received from the user.

According to an embodiment of the present disclosure, the payment server 1002 may transfer the command permitting the terms of a contract to the token server 1003 in operation 1041. For example, the payment server 1002 may transfer information (e.g., a T&C acceptance and/or a timestamp) associated with a payment to the token server 1003. In addition, the payment server 1002 may transfer the information associated with the payment to the token server 1003 and may request the token server 1003 to issue a token.

According to an embodiment of the present disclosure, the token server 1003 may transfer information associated with a token to the payment server 1002 in operation 1043. The information associated with the token may include a random value (a token reference) generated in the token server 1003 to distinguish between tokens, and an authentication policy. The information associated with the token may include a token ID. The token reference and the token ID may be distinguished from each other.

According to an embodiment of the present disclosure, the authentication policy may include information associated with a user authentication means (e.g., an iris or a fingerprint) to be used for a payment transaction using the payment application 1011 of the electronic device 1001.

According to an embodiment of the present disclosure, the payment server 1002 may assign a logical or physical space for the token reference based on the token reference received from the token server 1003. The payment server 1002 may generate an ID (a resource ID) for identifying the logical or physical space assigned to the payment server 1002. The resource ID may include an identifier associated with an enrollment resource and may be formed in the form of a uniform resource locator (URL). In addition, the resource ID may include, for example, reference information in which information associated with the token ID is stored and may include an address of the payment server, at which the token ID is stored.

In addition, the payment server 1002 may transfer, for example, at least one or more of a resource ID, a status, a token ID, or an authentication policy to the payment manager 1021 as a response to a request (e.g., POST/tokens) of the payment manager 1021 in operation 1045. The status may include a status (e.g., active, suspension, resume, disposal, or the like) of the token.

The payment manager 1021 may transfer at least a portion of information provided from the payment server 1002 to the payment application 1011 in operation 1047. The information transferred to the payment application 1011 may include a token ID and an authentication policy.

The token server 1003 may transfer, to the payment server 1002, a notification message (e.g., POST/notification) notifying the payment server 1002 to issue a token in operation 1049. The notification message may include at least one or more of a token reference, a token ID, a token value, a key for generating a cryptogram, or authentication means preference information. In addition, the notification message may include a mark (e.g., op=Provision) indicating that the message is a message for issuing a token.

The payment server 1002 may transfer at least a portion of the notification message from the token server 1003 to the payment manager 1021 in operation 1051. A message transferred to the payment manager 1021 may include at least one or more of a token ID, a resource ID, or a mark for issuing a token.

The payment manager 1021, which receives at least a portion of the message that the payment server 1002 transfers, may transfer a message (e.g., GET/token/{id}) making a request to the payment server 1002 for a token value in operation 1053. The message requesting the token key may include a resource ID.

For example, the payment server 1002 may transfer at least one of the token ID, the token status, the token value, or the token key as a response to the request (GET/token/{id}) of the payment manager 1021 in operation 1055. The at least one of the token ID, the token status, the token value, or the token key may be encrypted and transferred, for example.

According to an embodiment of the present disclosure, the payment manager 1021 may store information (e.g., the token ID, the token status, the token value, or the token key) received from the payment server 1002 in a security module (e.g., a trust zone (TZ)) in operation 1057. The TZ may be included in, for example, a trusted execution environment (TEE).

According to an embodiment of the present disclosure, the payment manager 1021 may transfer the information (e.g., the token ID, the token status, the token value, or the token key) received from the payment server 1002, for example, the information stored in the TZ to the payment application 1011. For example, the payment manager 1021 may transfer a command (e.g., active) associated with an active token to the payment application 1011 in operation 1059. For example, the payment manager 1021 may notify the payment application 1011 that the payment card is in an active status.

According to an embodiment of the present disclosure, the payment application 1011 may change a status of the PAN that the electronic device 1001 recognizes. For example, the payment application 1011 may change (e.g., enable) a status of the PAN so as to enable a payment by using the PAN.

According to an embodiment of the present disclosure, the payment application 1011 may transfer the status of the PAN thus changed to the payment manager 1021 in operation 1061. For example, the payment application 1011 may transfer, to the payment manager 1021, information (e.g., PAN enrolled) indicating the PAN is enrolled.

According to an embodiment of the present disclosure, the payment manager 1021 may transfer the status of the PAN thus changed to the payment server 1002 in operation 1063. For example, the payment manager 1021 may transfer a certain command (e.g., POST/reports) indicating that the PAN is changed to a payment-possible status (e.g., enable), to the payment server 1002. The payment manager 1021 may perform, for example, status synchronization with the payment server 1002. The payment server 1002 may transfer an acknowledgement of PAN enrollment to the token server 1003 in operation 1065.

An electronic device according to an embodiment of the present disclosure may flexibly cope with an authentication scheme that a credit card company or a financial institution requires. In addition, even though the authentication scheme that the credit card company or the financial institution requires is absent, the electronic device may perform biometric authentication by using a plurality of biometric sensors adaptively to various situations of the electronic device. Accordingly, it may be possible to efficiently manage power for driving the plurality of biometric sensors and to provide convenience of user authentication to the user.

As described above, an electronic device according to an embodiment an of the present disclosure may include a local wireless communication circuit, a first biometric sensor, a second biometric sensor, a security module that stores payment information corresponding to a payment card, a processor that is electrically connected with the first biometric sensor, the second biometric sensor, the local wireless communication circuit, and the security module, and a memory that is electrically connected with the processor. The memory may store instructions that cause the processor to select at least one of the first biometric sensor or the second biometric sensor, based on a security policy of an issuer of the payment card or a security policy of the payment card, to authenticate a user by using the selected biometric sensor, and to transmit the payment information to an external device through the local wireless communication circuit, if the authentication is successful.

In an embodiment of the present disclosure, the local wireless communication circuit may include a magnetic stripe transmission module, a magnetic secure transmission module, or an NFC module.

In an embodiment of the present disclosure, the first biometric sensor may include a fingerprint sensor, and the second biometric sensor may include an iris sensor.

In an embodiment of the present disclosure, the security module may include an SE, an eSE, a UICC, an eUICC, an SD card, a TZ, and a SIM card.

In an embodiment of the present disclosure, information associated with the security policy of the issuer of the payment card and the security policy of the payment card is stored in the security module or the memory.

In an embodiment of the present disclosure, the electronic device may further include a communication circuit that connects the electronic device and a server over a network. The payment information may be received through the communication circuit from the server during a payment transaction.

In an embodiment of the present disclosure, the memory may further store instructions that cause the processor to count the number of times authentication fails at the first biometric sensor and the number of times authentication fails at the second biometric sensor, and to proceed to another authentication procedure if the total number of authentication failures exceed a certain count.

In an embodiment of the present disclosure, the other authentication procedure may include an authentication procedure using a PIN.

In an embodiment of the present disclosure, the memory may further store instructions that cause the processor to select, if a security policy set by a user conflicts with the security policy of the issuer of the payment card or the security policy of the payment card, at least one of the first biometric sensor or the second biometric sensor, based on the security policy of the issuer of the payment card or the security policy of the payment card.

In an embodiment of the present disclosure, the memory may further store instructions that cause the processor to select, if the security policy of the issuer of the payment card or the security policy of the payment card does not designate at least one of the first biometric sensor or the second biometric sensor, at least one of the first biometric sensor or the second biometric sensor based on information obtained from a peripheral environment of the electronic device.

In an embodiment of the present disclosure, the electronic device may further include at least one of a gyro sensor or an acceleration sensor for sensing a posture of the electronic device. The memory may further store instructions that cause the processor to select at least one of the first biometric sensor or the second biometric sensor, based on information associated with the posture.

In an embodiment of the present disclosure, the information associated with the posture may include information associated with a slope of the electronic device to the ground. The memory may further store instructions that cause the processor to select the first biometric sensor if the slope is less than a certain angle and to select the second biometric sensor if the slope is not less than the certain angle.

In an embodiment of the present disclosure, the electronic device may further include an illuminance sensor that senses the amount of light around the electronic device. The memory may further store instructions that cause the processor to select the first biometric sensor if the amount of light is less than a certain value and to select the second biometric sensor if the amount of light is not less than the certain value.

In an embodiment of the present disclosure, the memory may further store instructions that cause the processor to select the second biometric sensor if an attachment of a foreign material to the first biometric sensor is sensed.

In addition, a payment method of an electronic device according to an embodiment of the present disclosure may include selecting at least one of a first biometric sensor or a second biometric sensor, based on a security policy of an issuer of a payment card or a security policy of the payment card, authenticating a user by using the selected biometric sensor, and transmitting payment information corresponding to the payment card to an external device if the authentication is successful.

The method according to an embodiment of the present disclosure may further include adding the number of times authentication using the first biometric sensor fails and the number of times authentication using the second biometric sensor fails, and authenticating a user by using another authentication procedure if the sum of the two numbers exceeds a certain count.

The method according to an embodiment of the present disclosure may further include, if the security policy of the issuer of the payment card or the security policy of the payment card does not designate at least one of the first biometric sensor or the second biometric sensor, selecting at least one of the first biometric sensor or the second biometric sensor based on information obtained from a peripheral environment of the electronic device.

According to an embodiment of the present disclosure, selecting at least one of the first biometric sensor or the second biometric sensor based on the information obtained from the peripheral environment of the electronic device may include selecting at least one of the first biometric sensor or the second biometric sensor based on information associated with a posture of the electronic device.

According to an embodiment an embodiment of the present disclosure, the information associated with the posture may include information associated with a slope of the electronic device to the ground. Selecting at least one of the first biometric sensor or the second biometric sensor based on the information associated with the posture may include selecting the first biometric sensor if the slope is less than a certain angle, and selecting the second biometric sensor if the slope is not less than the certain angle.

According to an embodiment of the present disclosure, selecting at least one of the first biometric sensor or the second biometric sensor based on the information obtained from the peripheral environment of the electronic device may include selecting the first biometric sensor if the amount of light around the electronic device is less than a certain value, and selecting the second biometric sensor if the amount of light is not less than the certain value.

According to an embodiment of the present disclosure, selecting at least one of the first biometric sensor or the second biometric sensor based on the information obtained from the peripheral environment of the electronic device may include selecting the second biometric sensor if an attachment of a foreign material to the first biometric sensor is sensed.

An electronic device according to an embodiment of the present disclosure may include a housing, a display exposed through the housing, a fingerprint sensor exposed through the housing, an image sensor that captures an image of the outside through the housing, at least one local wireless communication circuit included in the housing, at least one cellular communication circuit included in the housing, a processor that is electrically connected with the display, the fingerprint sensor, the image sensor, the local wireless communication circuit, and the cellular communication circuit, and a nonvolatile memory that is electrically connected with the processor and stores information associated with a first payment card and a second payment card. The memory may store instructions that, when executed, cause the processor to provide a user interface that allows a user to select the first payment card or the second payment card, on the display, to receive a user input for selecting one of the first payment card or the second payment card, to verify a biometric authentication scheme for using the selected payment card, to obtain biometric information of the user using at least one of the fingerprint sensor or the image sensor, depending on the verified biometric authentication scheme, to compare the biometric information with reference biometric information stored in advance in the memory, and to transmit payment information associated with the selected payment card to the outside using the local wireless communication circuit, depending on the comparison result.

According to an embodiment of the present disclosure, the image sensor may capture an iris image of a user.

According to an embodiment of the present disclosure, the local wireless communication circuit may include an NFC communication circuit or an MST circuit.

The term "module" used in present disclosure may represent, for example, a unit including one or more combinations of hardware, software and firmware. The term "module" may be used interchangeably with the terms "unit", "logic", "logical block", "component" and "circuit". The term "module" may indicate a minimum unit of an integrated component or may be a part thereof. The term "module" may indicate a minimum unit for performing one or more functions or a part thereof. The term "module" may indicate a device that may be implemented mechanically or electronically. For example, the term "module" may indicate a device that includes at least one of an application-specific IC (ASIC), a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a non-transient computer-readable storage media in the form of a program module. The instructions, when executed by a processor (e.g., the processor 120), may cause one or more processors to perform a function corresponding to the instruction. The non-transitory computer-readable storage media, for example, may be the memory 130.

A non-transitory computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). In addition, a program instruction may include not only mechanical code such as code generated by a compiler but also high-level language code executable on a computer using an interpreter. The hardware unit described above may be configured to operate via one or more software modules for performing an operation according to an embodiment of the present disclosure, and vice versa.

A module or a program module according to an embodiment of the present disclosure may include at least one of the above elements, a part of the above elements may be omitted, or additional elements may be further included. Operations performed by a module, a program module, or other elements according to an embodiment of the present disclosure may be executed sequentially, in parallel, repeatedly, or in a heuristic method. In addition, some operations may be executed in different sequences or may be omitted. Alternatively, other operations may be added.

An electronic device according to an embodiment of the present disclosure may flexibly cope with an authentication scheme that a credit card company or a financial institution requires. In addition, even though an authentication scheme that a credit card company or a financial institution requires is absent, the electronic device may perform biometric authentication by using a plurality of biometric sensors adaptively to various situations of the electronic device. Furthermore, a variety of effects directly or indirectly understood through the present disclosure may be provided.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:

1. An electronic device, comprising:
a wireless communication circuit;
a gyro sensor;
biometric sensors comprising an iris sensor and a fingerprint sensor;
a security module;
a processor electrically connected to the wireless communication circuit, the iris sensor, the fingerprint sensor, and the security module;
a memory storing instructions that, when executed by the processor, cause the processor to perform the steps of:
storing payment information of a user corresponding to a payment card in the security module;
storing a security policy in the security module or the memory;
storing an angle value in the security module or the memory;
executing a payment application for a payment transaction;
detecting an event for initiating the payment transaction;
in response to the detection of the event, either:
determining that a security policy for the payment card exists in the security module or the memory, and selecting one of the biometric sensors according to the security policy, or
determining that the security policy does not exist and based on the determination that the security policy does not exist:
identifying a slope of the electronic device using the gyro sensor;
selecting the fingerprint sensor when the slope is less than the stored angle value; or
selecting the iris sensor when the slope is equal to or greater than the stored angle value;
authenticating the user by using the selected biometric sensor; and
based on the authentication of the user, transmitting the payment information to a device through the wireless communication circuit.

2. The electronic device of claim 1, wherein the wireless communication circuit includes a magnetic stripe transmission module, a magnetic secure transmission module, or a near field communication (NFC) module.

3. The electronic device of claim 1, wherein the security module includes at least one of a secure element (SE), an embedded SE (eSE), a universal IC card (UICC), an embedded UICC (eUICC), or a subscriber identification module (SIM) card.

4. The electronic device of claim 1, further comprising:
a communication circuit connecting to a server over a network,
wherein the instructions, when executed by the processor, cause the processor to further perform the steps of receiving the payment information through the communication circuit from a server during the payment transaction.

5. The electronic device of claim 1,
wherein the instructions, when executed by the processor, cause the processor to further perform the steps of:
storing a count value in the security module or the memory;
counting a number of times authentication fails using the iris sensor or a number of times authentication fails using the fingerprint sensor; and
proceeding to another authentication procedure, if a sum of the number of times counted in which authentication has failed at the iris sensor or the fingerprint sensor exceeds the stored count value.

6. The electronic device of claim 5, wherein the another authentication procedure includes an authentication procedure using a personal identification number (PIN).

\* \* \* \* \*